United States Patent
Kipp et al.

(10) Patent No.: US 12,132,938 B2
(45) Date of Patent: *Oct. 29, 2024

(54) METHOD AND APPARATUS FOR CAPACITY EXCHANGE

(71) Applicant: COMCAST CABLE COMMUNICATIONS, LLC, Philadelphia, PA (US)

(72) Inventors: Neill Kipp, Centennial, CO (US); Martin Trang, Denver, CO (US); Jiang Xu, Highlands Ranch, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,747

(22) Filed: Jul. 14, 2021

(65) Prior Publication Data
US 2022/0078494 A1    Mar. 10, 2022

Related U.S. Application Data

(63) Continuation of application No. 16/775,028, filed on Jan. 28, 2020, now Pat. No. 11,102,521, which is a (Continued)

(51) Int. Cl.
*H04N 21/231* (2011.01)
*H04N 21/2747* (2011.01)
*H04N 21/845* (2011.01)

(52) U.S. Cl.
CPC . *H04N 21/23103* (2013.01); *H04N 21/23113* (2013.01); *H04N 21/2747* (2013.01); *H04N 21/8456* (2013.01)

(58) Field of Classification Search
CPC ....... H04N 21/23103; H04N 21/23113; H04N 21/2747; H04N 21/8456
See application file for complete search history.

(56) References Cited

U.S. PATENT DOCUMENTS 5,862,342 A    1/1999   Winter et al.
8,548,297 B2   10/2013  Pashkevich et al.
(Continued)

FOREIGN PATENT DOCUMENTS

WO    WO-2007125461 A1 *  11/2007   ......... H04N 21/4147

OTHER PUBLICATIONS

US Patent Application filed on Jan. 28, 2020, entitled "Fault Tolerant Capacity Exchange", U.S. Appl. No. 16/775,028.
(Continued)

*Primary Examiner* — Jefferey F Harold
*Assistant Examiner* — Alexander Boyd
(74) *Attorney, Agent, or Firm* — BakerHostetler

(57) ABSTRACT

Methods, systems, and apparatuses are described for fault tolerant network storage and delivery of recorded content. Two or more network digital video recorders may each receive a plurality of requests to record, archive, and/or play back content items, such as television programs. Each network digital video recorder may receive capacity reports of statistics such as storage and/or bandwidth from one or more other network digital video recorders. At least one of the network digital video recorders may determine whether, based on a network capacity, to record, archive, and/or playback content items. The methods, systems, and apparatuses may accommodate equipment failures that lead to partitions between network digital video recorders.

40 Claims, 20 Drawing Sheets

Related U.S. Application Data continuation of application No. 16/165,473, filed on Oct. 19, 2018, now Pat. No. 10,587,902, which is a continuation-in-part of application No. 14/730,519, filed on Jun. 4, 2015, now Pat. No. 10,791,346.

(56) References Cited

U.S. PATENT DOCUMENTS

| | | | |
|---|---|---|---|
| 9,674,247 B1 | 6/2017 | Ward et al. | |
| 9,712,861 B1* | 7/2017 | Milne | H04N 21/4382 |
| 10,587,902 B2 | 3/2020 | Kipp et al. | |
| 10,805,688 B1* | 10/2020 | Long | H04N 21/2221 |
| 2003/0118322 A1 | 6/2003 | Kim | |
| 2003/0133453 A1 | 7/2003 | Makishima et al. | |
| 2004/0156614 A1 | 8/2004 | Bumgardner et al. | |
| 2005/0193023 A1 | 9/2005 | Ismail | |
| 2008/0046954 A1* | 2/2008 | Bhogal | H04N 21/4147 725/89 |
| 2008/0086750 A1 | 4/2008 | Yasrebi et al. | |
| 2008/0282312 A1 | 11/2008 | Blinnikka | |
| 2010/0131995 A1 | 5/2010 | Guo et al. | |
| 2010/0319044 A1 | 12/2010 | Agans et al. | |
| 2011/0126258 A1 | 5/2011 | Emerson et al. | |
| 2011/0231569 A1 | 9/2011 | Luby et al. | |
| 2012/0210382 A1 | 8/2012 | Walker et al. | |
| 2013/0080565 A1 | 3/2013 | Van et al. | |
| 2014/0023340 A1 | 1/2014 | Civiletto et al. | |
| 2014/0153904 A1 | 6/2014 | Adimatyam et al. | |
| 2015/0350701 A1 | 12/2015 | Lemus et al. | |
| 2017/0188072 A1* | 6/2017 | Major | H04N 21/237 |
| 2018/0248948 A1* | 8/2018 | Rementilla | H04N 21/43615 |
| 2018/0255347 A1* | 9/2018 | Kharitonsky | H04N 21/4147 |
| 2018/0359517 A1* | 12/2018 | Hasek | H04N 21/4622 |
| 2019/0268631 A1* | 8/2019 | Beaty | H04N 21/47217 |
| 2019/0313157 A1* | 10/2019 | Fitzgerald | H04N 21/2747 |

OTHER PUBLICATIONS

US Patent Application filed on Aug. 27, 2020, entitled "Recorded Content Storage and Delivery Management", U.S. Appl. No. 17/004,359.

US Patent Application filed on Nov. 4, 2021, entitled "Recorded Content Storage and Delivery Management", U.S. Appl. No. 17/453,578.

US Patent Application filed on Mar. 17, 2022, entitled "Recorded Content Storage and Delivery Management", U.S. Appl. No. 17/697,312.

* cited by examiner

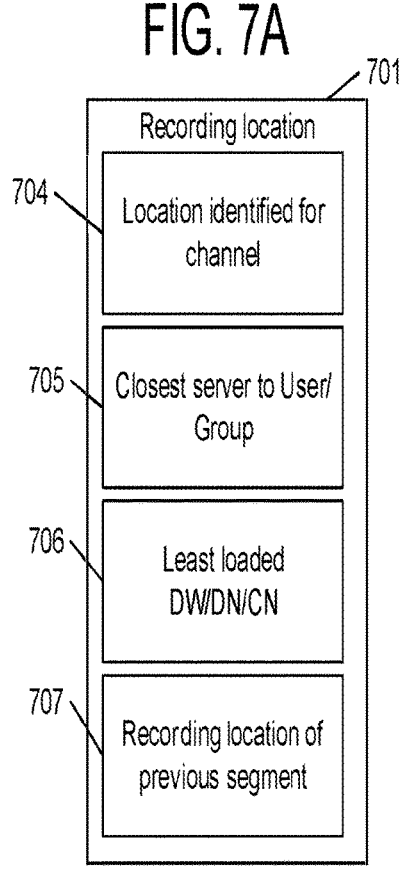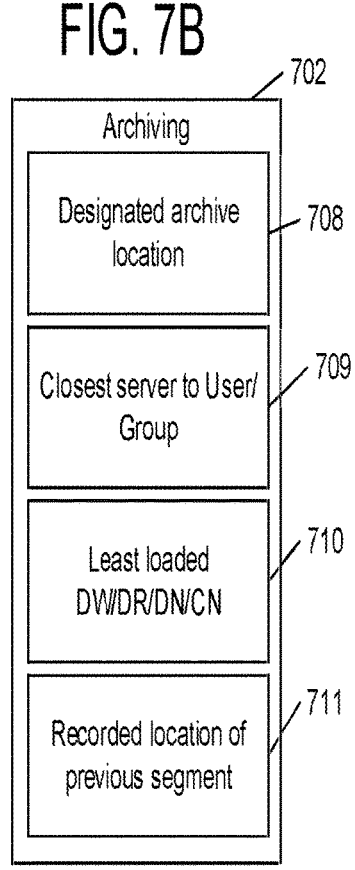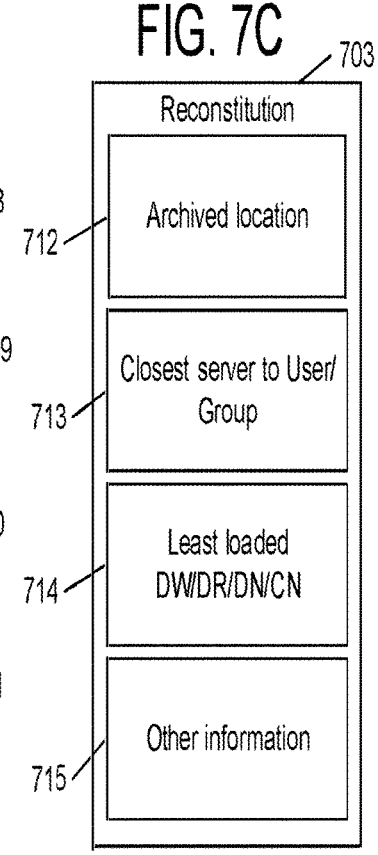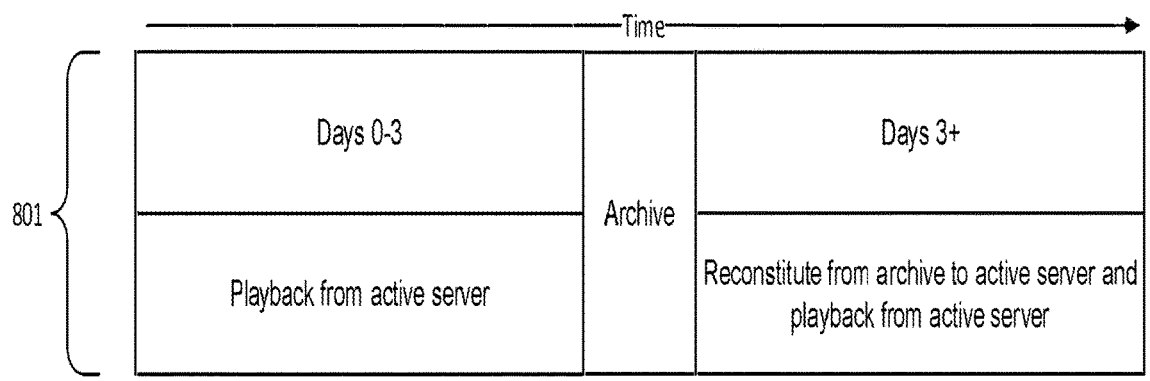

| | | Designated Archive Location (1302) | Closest to User/Group (1303) | Least Loaded (1304) | Previous Segment Location (1305) | Score for nDVR A (1306) | Score for nDVR B (1307) | Archive at: (1308) |
|---|---|---|---|---|---|---|---|---|
| | Weighting | 1.5 | .5 | .5 | .1 | | | |
| Q1 t0 of Y on Ch. X for U1/G | | A | A | A | A | 2.6 | 0.0 | A |
| Q2 t0 of Y on Ch. X for U2/G | | B | A | A | A | 1.1 | 1.5 | B |
| Q1 t0 of Y on Ch. X for U3/H | | A | B | A | A | 2.1 | 0.5 | A |
| Q1 t1 of Y on Ch. X for U1/G | | A | A | B | A | 2.1 | 0.5 | A |
| Q2 t1 of Y on Ch. X for U2/G | | B | A | B | A | 0.6 | 2.0 | B |
| Q1 t1 of Y on Ch. X for U3/H | | A | B | B | A | 1.6 | 1.0 | A |
| Q1 t2 of Y on Ch. X for U1/G | | A | A | A | A | 2.6 | 0.0 | A |
| Q1 t2 of Y on Ch. X for U1/G | | A | A | A | B | 2.5 | 0.1 | Delete |
| Q2 t2 of Y on Ch. X for U2/G | | B | A | A | B | 1.0 | 1.6 | B |
| Q1 t2 of Y on Ch. X for U3/H | | A | B | A | B | 2.0 | 0.6 | A |

| | Current Archive Location | Closest to User/Group | Least Loaded | Other Information | Score for nDVR A | Score for nDVR B | Reconstitute at: |
|---|---|---|---|---|---|---|---|
| Weighting | 0.5 | 1.6 | 0.5 | 0.1 | | | |
| R1 t0 of Y on Ch. X for U1/G G | A | A | A | A | 2.7 | 0.0 | A |
| R2 t0 of Y on Ch. X for U2/G G | B | A | A | A | 2.2 | 0.5 | A |
| R1 t0 of Y on Ch. X for U3/G H | A | B | A | A | 1.1 | 1.6 | B |
| R1 t1 of Y on Ch. X for U1/G G | A | A | B | A | 2.2 | .05 | A |
| R2 t1 of Y on Ch. X for U2/G G | B | A | B | A | 1.7 | 1.0 | A |
| R1 t1 of Y on Ch. X for U3/G H | A | B | B | A | 0.6 | 2.1 | B |
| R1 t2 of Y on Ch. X for U1/G G | A | A | A | B | 2.6 | 0.1 | A |
| R2 t2 of Y on Ch. X for U2/G G | B | A | A | A | 2.2 | 0.5 | A |
| R1 t2 of Y on Ch. X for U3/G H | A | B | A | A | 1.1 | 1.6 | B |

FIG. 15

METHOD AND APPARATUS FOR CAPACITY EXCHANGE

CROSS REFERENCE TO RELATED APPLICATIONS

This application is a continuation of U.S. patent application Ser. No. 16/775,028, filed Jan. 28, 2020, which is a continuation of U.S. patent application Ser. No. 16/165,473, filed Oct. 19, 2018, now U.S. Pat. No. 10,587,902, which is a continuation-in-part of U.S. patent application Ser. No. 14/730,519, filed Jun. 4, 2015, now U.S. Pat. No. 10,791,346, each of which is hereby incorporated by reference in their entirety.

BACKGROUND

Network digital video recorders (nDVRs) may be useful tools in recording scheduled video content for users to watch at a more convenient time, but operating a network of nDVRs may require substantial processing and resources. It is possible for nDVRs to become overburdened and/or fail, and degrade the users' overall experience using nDVRs. Solutions that add one or more load balancers between a content source and the nDVRs do not resolve issues associated with connectivity failures, as the load balancers become possible points of failure.

SUMMARY

The following summary presents a simplified summary of certain features. The summary is not an extensive overview and is not intended to identify key or critical elements.

Systems, apparatuses, and methods are described for fault tolerant network storage and delivery of recorded content. Two or more nDVRs may be located at respective data centers with each nDVR receiving a plurality of requests to record content. The nDVRs in the data centers may include capacity exchange servers that compile and exchange capacity information. A capacity exchange server of each data center's nDVR may poll one or more components in the nDVR for their current utilization. The utilization information may be compiled into one or more messages that may be exchanged with one or more capacity exchange servers among the data centers. From that exchanged capacity information, the nDVRs may each determine where to record, where to archive, and/or where to reconstitute content items or segments of content items. Based on the available capacity across the group of nDVRs, programs or segments of programs may be recorded by one or more nDVRs and/or deduplicated.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 7A-7C show examples of factors considered during determinations where segments are to be recorded, archived, and/or reconstituted.

FIG. 8 shows an example of a timeline indicating from where content is played back for users.

FIG. 13 shows examples of values and weighting factors used to determine where to archive segments.

FIG. 15 shows examples of values and weighting factors used to determine where to reconstitute segments for playback.

DETAILED DESCRIPTION

Figure 1:
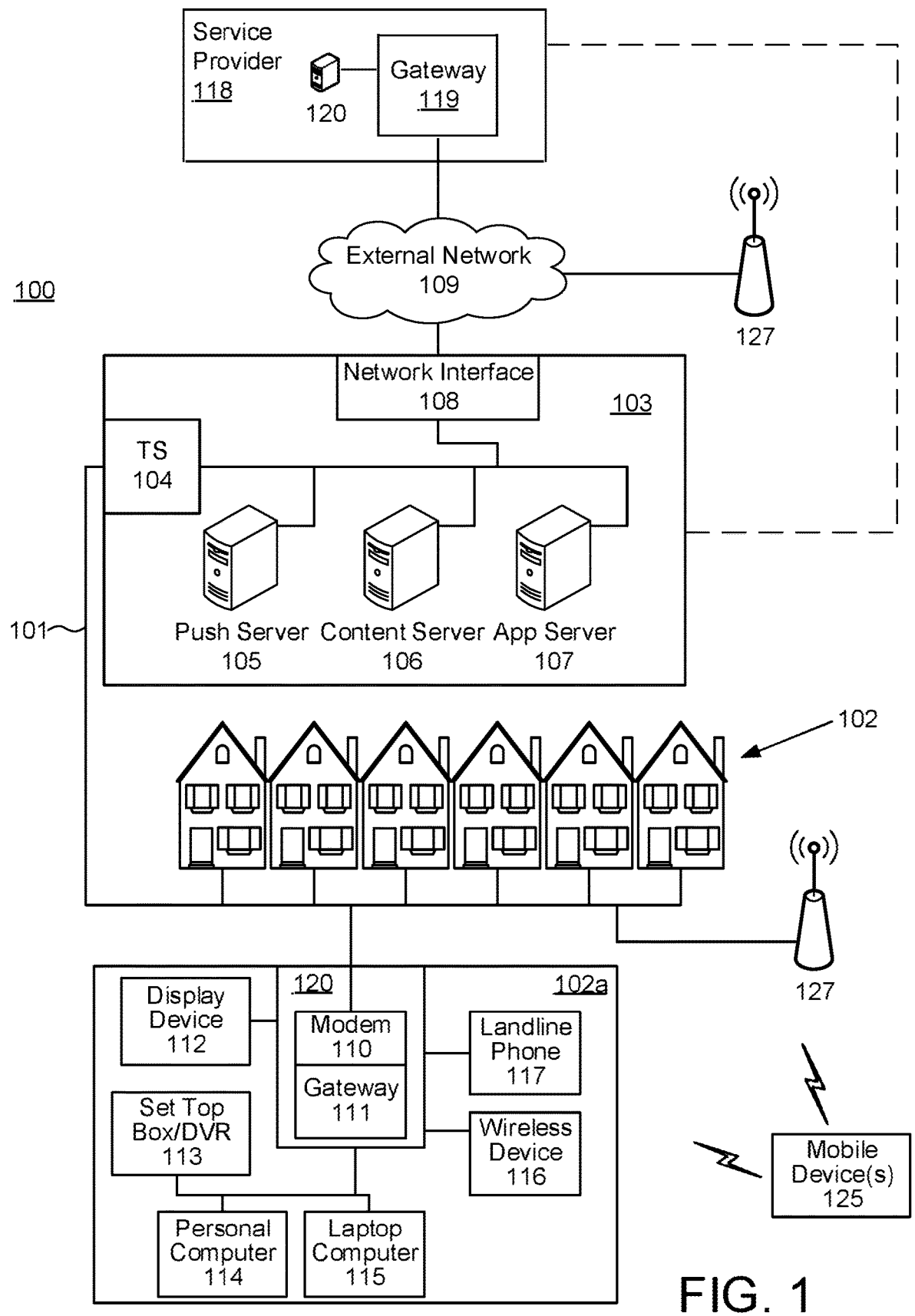
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

In addition, the phraseology and terminology used herein are for the purpose of description and should not be regarded as limiting. Rather, the phrases and terms used herein are to be given their broadest interpretation and meaning.

Fault tolerant capacity management may be used in connection with recording content for users. Content may comprise video and/or audio programs available from a content provider. A content item may comprise a specific video and/or audio program. The content item may comprise one or more segments. Based on various restrictions, a separate copy of a content item may be recorded for each user that requests content to be stored by an nDVR. Two or more nDVRs may operate together by exchanging capacity information and determining where to record content based on the exchanged capacity information.

A first segment from the plurality of segments may be recorded in a first storage, such as a recording storage (on a hard drive) of a data center. A second segment may be recorded in a second storage of another data center. The first and second segments may be consolidated at a later time in one of the data centers or in yet another data center.

The segmented nature of content may be leveraged to facilitate the storage and delivery of the content using different nDVRs in different data centers. Multiple requests from multiple users to record a particular content item show may be received. A unique copy of the content item may be generated and stored for each of the requesting users (e.g., by a recording management system). During recording of the content item, multiple copies of each segment may be generated. A segment of the content item may be selected, and a specific media recorder server may be selected to record that segment. That media recorder server or another media recorder server may be selected to generate a copy of the segment in a recording storage for each of the requesting users. The media recorder server may perform a single access of the segment and direct the recording storage to generate the multiple copies of the segment in a single write operation and/or may perform multiple accesses of the segment and direct the storage to generate portions of the copies at different times. The copies of the segment may be written to a hard disk or solid-state memory of the recording storage in sequence. The method may be repeated for each segment of the content item until a complete unique copy of the content item exists in the recording storage for each requesting user. Where a user wishes to view the recorded content item, the user's unique copy in the recording storage may be delivered to that user's device for viewing.

nDVRs in different data centers may communicate their respective capacity to each other. Based on the exchanged capacity information and/or possibly other information, each nDVR may determine whether it should record or not record incoming segments. Based on updated capacity information, each nDVR may determine whether its recorded segments should be archived locally, forwarded to another nDVR, and/or deleted. Further, each nDVR may determine where archived content should be reconstituted for playback to a user (e.g., retrieved from an archive and stored in a form available for playback). Each nDVR may independently arrive at a conclusion of which segments to record and/or which not to record. The conclusions of the nDVRs need not be shared, as each may arrive at the same conclusion(s) of where each segment should be recorded. Using one or more of these approaches, network traffic commonly associated with load balancers may be reduced.

The recording capacity of an nDVR may be based on one or more of the following: network bandwidth, processing power, and/or available storage. Based on measurements for one or more of these parameters dropping below an expected level of service, an nDVR may be identified and/or indicated as being over-capacity or, if unavailable, partitioned from the rest of the network. For explanatory purposes, the state of an nDVR of a first data center being off-line or no longer communicating with other nDVRs of other data centers may be referred to as "partitioned" from the other nDVRs.

Capacity information for an nDVR may be indicated by one or more of the following values: a current quantity of recording requests being handled by one or more media storage servers in an nDVR; a maximum quantity of recording requests that may be handled by the one or more media storage servers in the nDVR; a current quantity of playback requests being handled by the one or more media storage servers in the nDVR; a maximum quantity of playback requests that may be handled by the one or more media storage servers in the nDVR; a current server load of internal, disk-related traffic in the nDVR; a maximum server load of internal, disk-related traffic in the nDVR; a current server load of the processing of record and playback requests in the nDVR; or a maximum server load of the processing of record and/or playback requests in the nDVR.

A capacity exchange server may poll the components of its local nDVR and compile the received information as its local capacity data. The capacity exchange server may forward its local capacity data to other capacity exchange servers of other nDVRs and likewise receive capacity data from those other capacity exchange servers. The capacity exchange server may compile its local capacity data with the capacity data from the other capacity exchange servers to generate a current picture of capacity data across the combination of nDVRs in the responding data centers. The current capacity information of the network may be used by the nDVRs to determine one or more of whether to record segments, whether to archive recorded segments, and/or whether to reconstitute archived segments. Some or all operations described as being performed by separate computing devices of an nDVR (e.g., different servers and other computing devices of FIGS. 3 and 4 below) may be performed by a single computing device.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers in communication with other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, and the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), a twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Further, one or more service providers 118 may be connected to the network 109. The service provider 118 may provide video-on-demand, streaming content, linear content, Voice over Internet Protocol (VoIP) telephony, and/or other services. The service provider 118 may include one or more gateways 119 connected to one or more servers 120 to provide the services desired by users at the premises 102. To provide those services, the service provider 118 may use the gateways 119 to manage the requests from the premises 102 for services provided by the one or more servers 120.

In FIG. 1, the service provider 118 is shown with the gateway 119 located at a common location with the server 120. The gateway 119 may also or alternatively be located remote from the server 120. Additionally or alternatively, while the service provider 118 is shown indirectly connected to the local office 103 via the network 109, the service provider 118 may be directly connected to the local office 103 as shown by a dashed line connecting the local office 103 to the service provider 118, that is, without connecting via the network 109.

Figure 2:
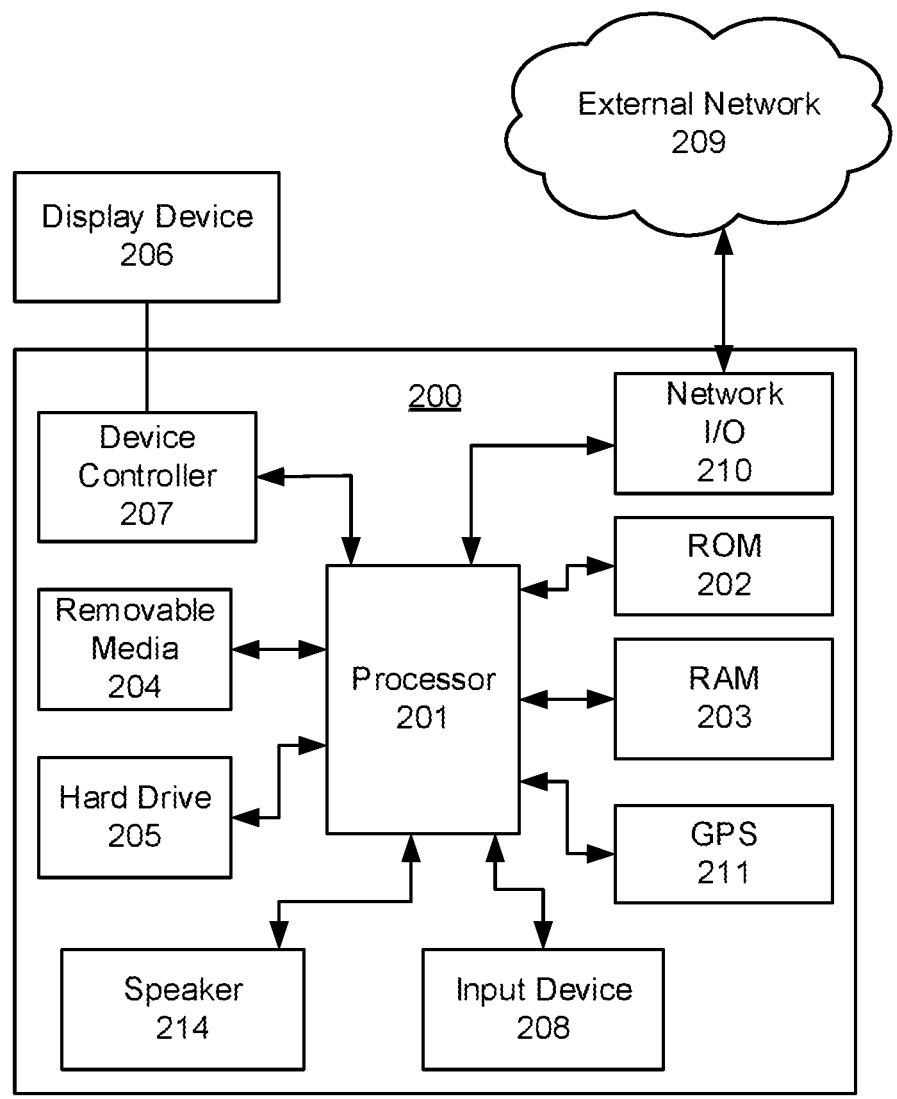
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109, any of the devices associated with the service provider 118) and any other computing devices discussed herein (e.g., channel monitor servers, media recorder servers, media storage, capacity exchange servers, archive servers, reconstitution servers, and guide scheduling servers). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all operations described herein. Such memory and processor(s) may also or alternatively be implemented through one or more Integrated Circuits (ICs). The IC may be, for example, a microprocessor that accesses programming instructions or other data stored in a ROM and/or hardwired into the IC. For example, the IC may comprise an Application Specific Integrated Circuit (ASIC) having gates and/or other logic dedicated to the calculations and other operations described herein. The IC may perform some operations based on execution of programming instructions read from the ROM or the RAM, with other operations hardwired into gates or other logic. Further, an IC may be configured to output image data to a display buffer.

Services provided by the local office 103 and/or the service provider 118 (e.g., using the server 120 at the service provider 118 and/or a server located at a remote location) may comprise network digital video recording services. Those services may be implemented using hardware components or a combination of hardware and software components deployed as an integrated, fault-tolerant computing platform. In a system experiencing no connectivity or system failures, for a given recording for a given user, a single copy may be made. However, where a single nDVR fails or experiences reduced capacity, one or more nDVRs in other locations (e.g., other data centers, other local offices, other service providers, etc.) may assist in the recording workload. For purposes of explanation, "data center" may be used to refer generally to a local office, a service provider, and/or other collection of computing devices. Different data centers may cooperate and share their nDVRs among themselves. If an nDVR of a first of those data centers may be offline, an nDVR of another of those data centers may make recording decisions by itself. Further, based on the offline nDVR coming back online, the overall system may recover by consolidating recorded segments and/or de-duplicating duplicate recordings of the same segment (if any) for a single user. Further, having at least one partially redundant system may permit opportunities for system maintenance without temporary loss of recording capabilities.

Figure 3:
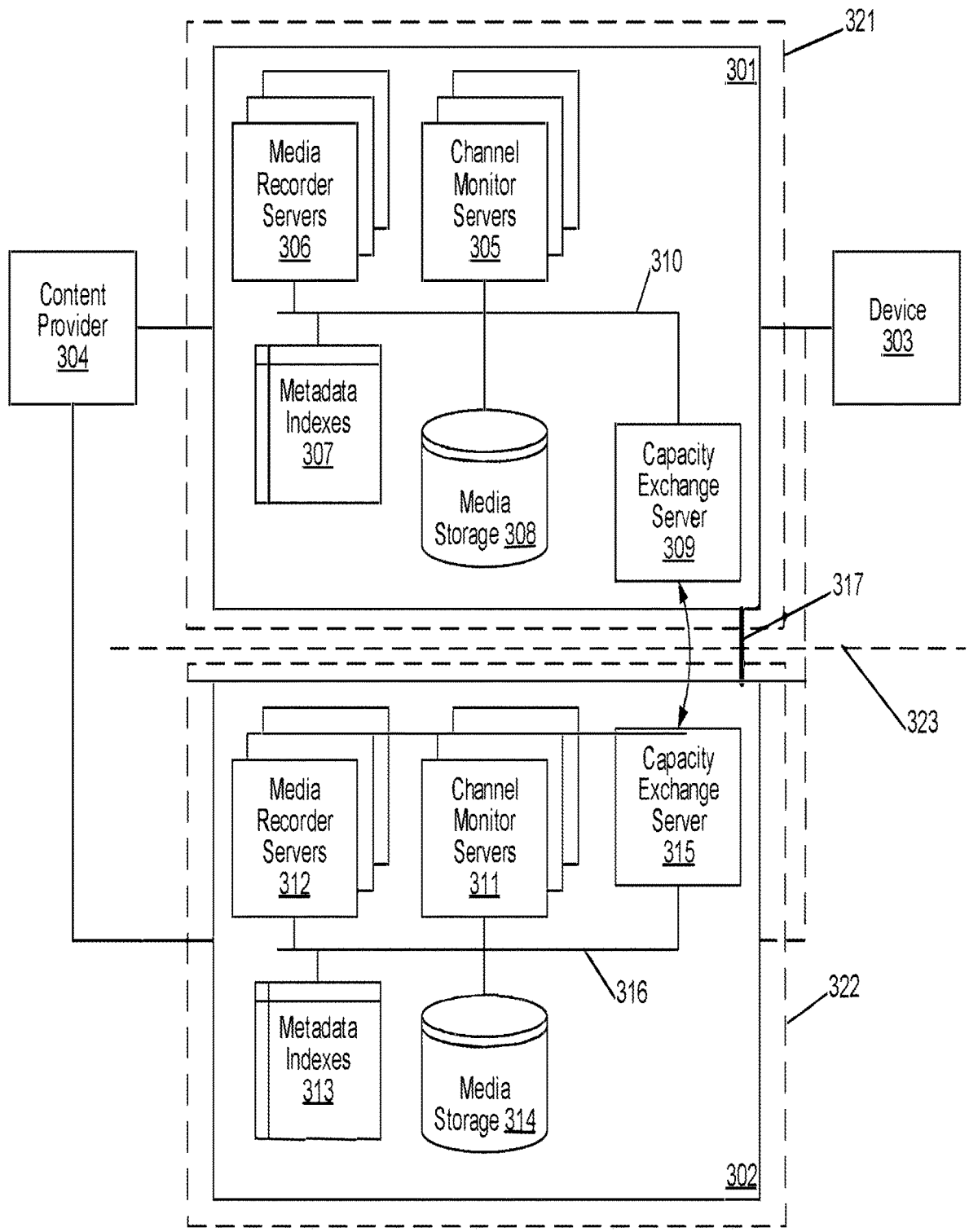
FIG. 3 shows an example of an arrangement of two nDVRs with capacity exchange servers.
Figure 4:
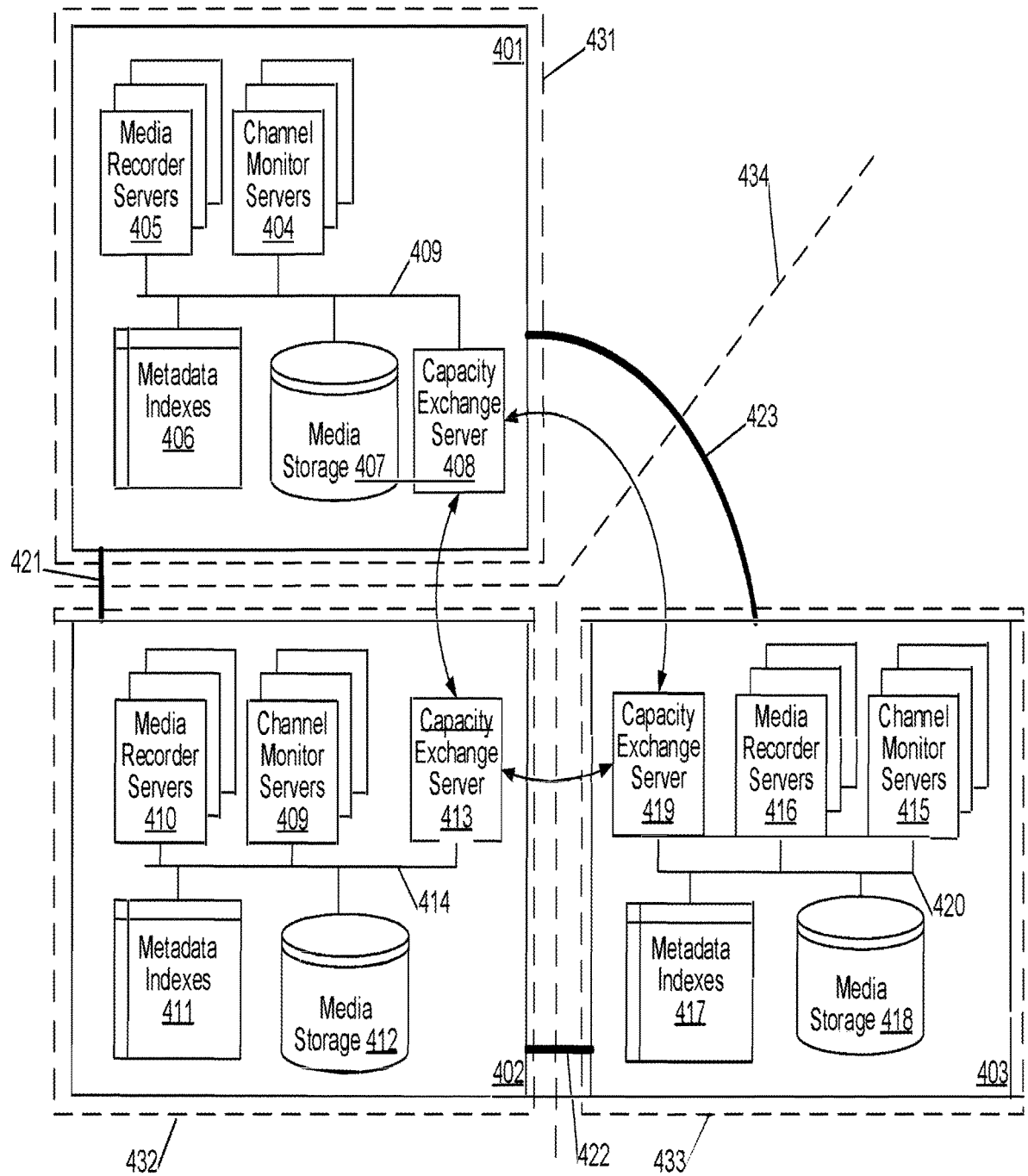
FIG. 4 shows an example of an arrangement of three nDVRs with capacity exchange servers.

Independent nDVRs may be located in different data centers. A ratio of segments recorded between associated data centers may be equal (e.g., 50% of recording requests initially received by one data center being sent to another data center) or may be biased (e.g., 80% of recordings requests initially received by one data center may be handled locally while the remaining 20% may be handled by one or more other data centers). FIG. 3 shows an example of an arrangement of two nDVRs, each in a separate data center. FIG. 4 shows an example of an arrangement of three nDVRs, each in a separate data center.

FIG. 3 shows an example of two nDVRs in separate data centers that may assist each other if one of the two nDVRs is unable to service all of its recording requests. FIG. 3 shows a first nDVR 301, a second nDVR 302, and a device 303 (e.g., a user device). The device 303 may send one or more messages indicating content item that a user desires to record. The first nDVR 301 may be located in a data center 321 and the second nDVR 302 may be located in a data center 322. The data centers 321 and 322 may be geographically separated from each other and primarily serve the customers in their respective regions. The regions may be generally shown as above and below dashed line 323.

Content such as video programs may be received from a content provider 304, with the content provider 304 having various storage devices and servers (not shown). Content items to be recorded may be indicated through messages from a guide scheduling server 1607 (described in relation to FIG. 16 below). The content items may comprise a plurality of segments storable on a storage medium.

If more recording requests exist than a single nDVR may be able to handle, the nDVR may not be able to satisfy all recording requests. The nDVR 301 in the data center 321 may comprise a capacity exchange server 309 that may exchange capacity information with another capacity exchange server 315 of another nDVR 302 in a different data center 322. The data centers may be connected by a high capacity network link 317 (for example, 80 Gbps or above).

A device 303 (e.g., one or more devices 112-117 of the premises 102a, or another computing device) may be in communication with the first nDVR 301 via a network as described in FIGS. 1 and 2. The device 303 may be one or more of the devices described in FIG. 1 including but not limited to set-top boxes (STBs), digital video recorders (DVRs), computer servers, televisions, personal computers, laptop computers, wireless devices (comprising wireless laptops and netbooks, mobile phones, mobile televisions, personal digital assistants (PDA), etc.), and/or any other computing device. The device 303 may send one or more requests for recording of content to the first nDVR 301. In FIG. 3, the content requested to be recorded may be provided by a content provider 304. In FIG. 3, the content provider 304 may be connected to both the first nDVR 301 and the second nDVR 302. The connection may comprise one of the connection networks described in FIG. 1.

To retrieve a content item to be recorded, the nDVR 301 may send a request to the content provider 304 to obtain one or more segments of the content item. The request may be a hypertext transfer protocol (HTTP) GET command, an HTTP POST command, or other request. In the first nDVR 301, one or more channel monitor servers 305 may read one or more lists of segments to be recorded. The one or more channel monitor servers 305 may distribute the recording requests among one or more media recorder servers 306. The lists of segments may comprise adaptive bitrate manifests comprising one or more of video, audio, pixel resolution, and related information for the segments (e.g., the length of each segment). The content item may arrive in two-second segments. The lists of segments to record may also indicate the origin of the content item.

The first nDVR 301 may comprise one or more channel monitor servers 305 that may monitor channels for the content to be recorded. Each of the multiple channel monitor servers 305 may monitor a specific logical service (e.g., NBC, ESPN, HBO, and the like) (referred to herein as a "channel") or may monitor multiple logical services (or channels). Each channel may have a designated primary recording location selected from one of the data center 321 and the data center 322. The other of the data center 321 and the data center 322 may be designated as the secondary recording location. If the primary recording location for a channel is unavailable or overloaded, the secondary recording location of the data centers 301 and 302 may temporarily handle any recording, archiving, and/or reconstitution processes for the primary recording location while the primary recording location is unavailable. In FIG. 3 with the two data centers 321 and 322, any data center not designated as the primary recording location for a specific channel may be the secondary recording location for that channel. In FIG. 4 with three data centers 431-433, a data center not designated as the primary recording location for that channel may be either a secondary or tertiary recording location for that channel. With three or more data centers that work together to service users, additional ordered designations may be made (quaternary, quinary, senary, and the like). A tertiary and/or other higher order designation may be optional. For example, three or more data centers may be associated to serve a region of users but only a secondary recording location designated and no tertiary or subsequent priority of recording locations designated. Reducing the quantity of tertiary and subsequent recording locations may provide reduced overhead computing as a tradeoff for reduced backup capabilities in rare times of multiple data centers being overloaded or unavailable.

Information indicating the content, the channel, the user (and/or the user's account and/or the user's device) for which the segment may be recorded, and other relevant information may be sent to one or more of the channel monitor servers 305 and/or one or more of the media recorder servers 306. The channel monitor servers 305 (referred to herein as "channel monitors") may monitor specific channels for the content indicated by users by reading adaptive bit rate manifests from the content provider 304. The content from the content provider 304 may be received as adaptive bitrate manifests identifying and/or indicating segments of a given length (e.g., from 2-6 seconds). The channel monitors 305 may read indication information from the adaptive bitrate manifests and check whether content items requested by one or more of the users appears in the adaptive bitrate manifests. Based on a segment having been identified by a channel monitor, the channel monitor may request one or more of the media recorder servers 306 (referred to herein as "media recorders") to record the identified segment and possibly the quantity of copies of the segment to be recorded. The media recorder servers 306 may record the incoming segments in the media storage 308. The media recorder servers 306 may generate metadata indexes 307 that indicate the recorded segments in the media storage 308 for subsequent retrieval, archiving, and/or reconstitution. An internal network 310 may interconnect the various components of the nDVR 301. A media recorder server 306 may perform a single access of the segment from the storage medium and may generate a copy of the segment in the media storage 308 for each request received by the nDVR 301 to record the content item. The adaptive bitrate manifests may also be distributed by the content provider 304 to the nDVR 302 in the data center 322, permitting the nDVR 302 to record segments if the nDVR 301 or the data center 321 may be offline and/or may otherwise not be recording the segments in which the nDVR 301 was indicated as the primary recording location.

The second nDVR 302 in the data center 322 may comprise similar components to those of the first nDVR 301 in the data center 321. The second nDVR 302 may comprise one or more channel monitors 311 that monitor different channels for the content to be recorded. The second nDVR 302 may also receive content from the content provider 304. The channel monitors 311 may detect segments to be recorded and may instruct one or more media recorders 312 to record the detected segments. The media recorders 312 may record the incoming segments in the media storage 314. The media recorders 312 may generate metadata indexes 313 that specify the recorded segments for subsequent retrieval, archiving, and/or reconstitution. To further assist the detection of segments and the recording of detected segments, the second nDVR 302 may receive recording requests from the device 303 and may assist in the recording of the detected segments.

The first nDVR 301 may further comprise a capacity exchange server 309 that may exchange capacity information with a capacity exchange server 315 of the second nDVR 302 via a communication link 317. The communication link 317 may include a high capacity fiber optic point-to-point connection, a high capacity fiber optic network, and/or other connection. The exchanged capacity information may permit the second nDVR 302 of the data center 322 to assist the first nDVR 301 of the data center 321 in the recording of content where that content may normally be recorded by the first nDVR 301 of the data center 321. Likewise, the first nDVR 301 may assist the second nDVR 302 by recording content that may normally be recorded by the second nDVR 302. Further, heartbeat signals may be exchanged between the capacity servers 309 and 315. The failure of a first capacity exchange server to receive the heartbeat from a second capacity exchange server within an expected time window may be interpreted by the first capacity exchange server as indicative that the nDVR associated with the second capacity exchange server may be unavailable.

A collection of the capacity exchange servers may treat each nDVR as a single system as having at least two general statuses: available capacity and diminished capacity (where diminished capacity includes no capacity, e.g., being partitioned). These two general statuses may be subdivided into additional statuses as desired. Where a given nDVR may have diminished capacity relative to being able to satisfy the recording requests from user devices of which it may be associated, the channel monitor servers may designate another nDVR as the primary recording location. That other nDVR may have the most available capacity and/or the best redundancy. A 1080-pixel video track may be recorded on one nDVR with higher available capacity and a 720-pixel track may be recorded on a different nDVR with lower capacity or the tracks may be recorded by the same nDVR.

FIG. 4 shows an example of three nDVRs exchanging capacity information and assisting each other in the recording of content. User devices and content providers are not shown in FIG. 4. FIG. 4 shows an nDVR 401 in a data center 431, an nDVR 402 in a data center 432, and an nDVR 403 in a data center 433. The data centers 431-433 may be geographically separated from each other as shown generally by dashed lines 434 or may be located together but designated to serve different groups of users.

The nDVRs 401-403 may include similar components to those of the nDVRs 301 and 302 of FIG. 3. Specifically, the nDVR 401 may comprise one or more channel monitoring servers 404, one or more media recorder servers 405, metadata indexes 406, media storage 407, and a capacity exchange server 408, with these components connected by an internal network 409. The nDVR 402 may comprise one or more channel monitoring servers 409, one or more media recorder servers 410, metadata indexes 411, media storage 412, and a capacity exchange server 413, with these components connected by an internal network 414. The nDVR 403 may comprise one or more channel monitoring servers 415, one or more media recorder servers 416, metadata indexes 417, media storage 418, and a capacity exchange server 419, with these components connected by an internal network 420. The nDVR 401 may be connected to the nDVR 402 via a high speed connection 421, the nDVR 402 may be connected to the nDVR 403 via a high speed connection 422, and the nDVR 403 may be connected to the nDVR 401 via a high speed connection 423. The high speed connections 421-423 may be three separate connections or may be part of a single network interconnecting nDVRs 401-403 and the data centers in which they are located. The capacity exchange server 408 may exchange capacity information with each of the capacity exchange server 413 and the capacity exchange server 419.

One copy of a recorded content item may ultimately exist, across a collection of nDVRs, per requesting user. A copy of a segment may be used to fill in missing segments of other recordings based on network failures or connectivity issues. For example, the first nDVR 301 may be, at times, unable to record all segments of requested content. This unavailability may be due to a spike in requests from devices that causes the recording capacity for the first nDVR 301 to be exceeded. The first nDVR 301 may suffer a component failure or network failure that reduces its recording capacity for an interval long enough to reduce its ability to record segments. Further, the capacity exchange between the first nDVR 301 and the second nDVR 302 may be disrupted such that the second nDVR 302 may not know whether the first nDVR 301 may be capable of, or is in fact, recording segments. The first nDVR 301 may not be exchanging heartbeat signals with the second nDVR 302.

Based on the lack of a heartbeat from a capacity exchange server of one of the nDVRs, the remaining nDVRs may begin recording segments based on their own determinations of where segments should be recorded based on each's determination of which segments should be recorded locally in view of the altered recording capacity across the data centers. The capacity exchange servers of the nDVRs may permit each of the connected nDVRs to know the current capacity of the other nDVRs and to handle faults and sudden spikes gracefully by dynamically adjusting their recordings in light of changes in capacity of the other nDVRs.

Each capacity exchange server may receive one or more capacity reports from the other capacity exchange servers. A capacity report may include current usage and/or maximum capabilities for one or more of the following: a disk writing load, a disk reading load, a disk network load, or a computational network load.

Figure 5A:
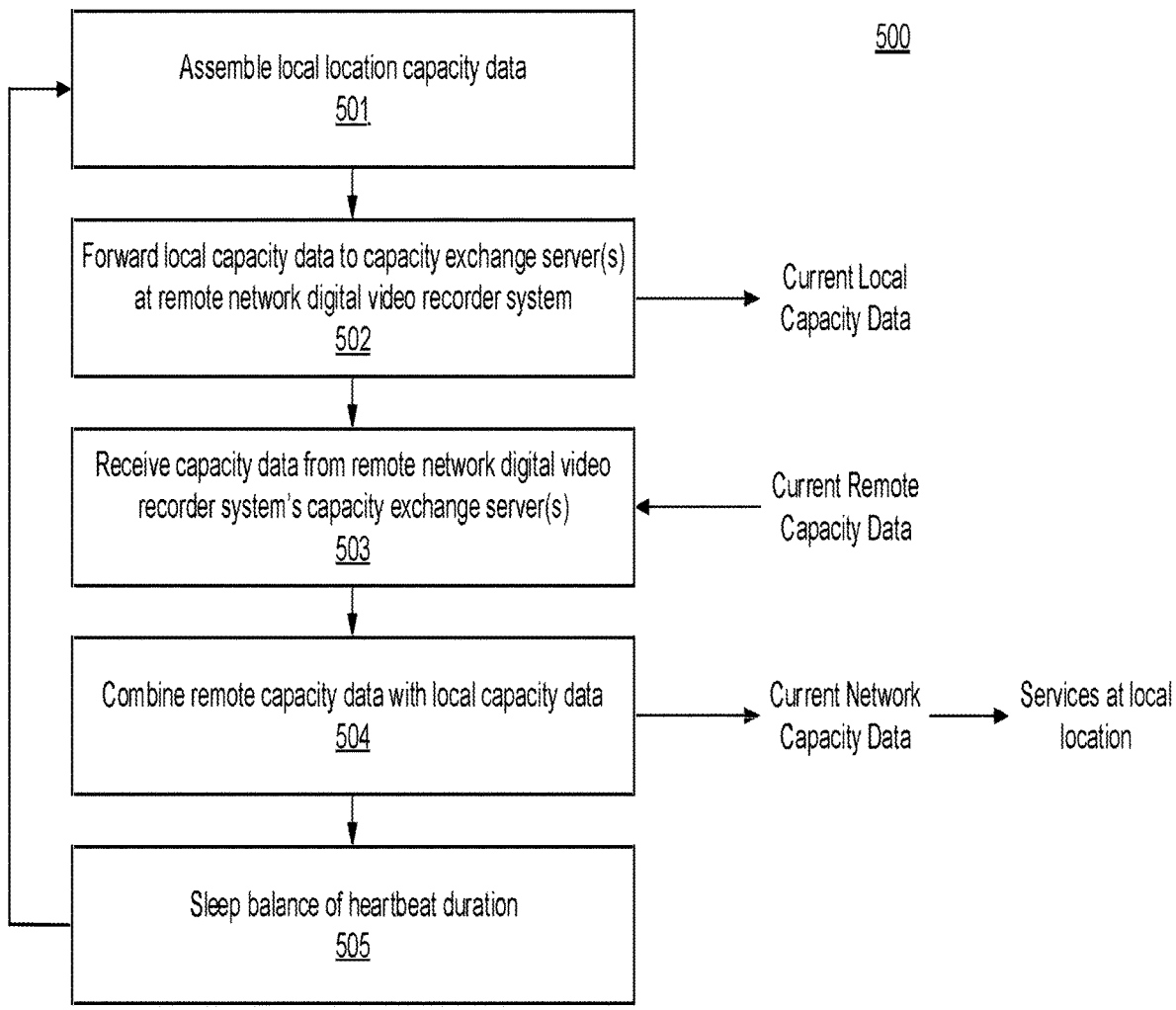
FIG. 5A is a flow chart showing an example method for exchanging capacity data between nDVRs.

FIG. 5A is a flowchart showing an example method 500 for exchanging capacity data using the capacity exchange servers. Although FIG. 5A and other figures describe operations performed by capacity exchange servers and/or by other elements, some or all operations may also or alternatively be performed by one or more computing devices. In step 501, an nDVR's capacity exchange server may receive capacity information from other components in the nDVR (e.g., one or more of the channel monitors, the media recorders, and/or media storage). The capacity exchange server may poll each of the channel monitors, media recorders, and/or media storage or may wait for one or more of these elements to forward its status to the capacity exchange server. The capacity exchange server may assemble the received capacity information into a summary of capacity for that local nDVR. In step 502, the capacity exchange server may forward the current local capacity data to a capacity exchange server at a remote nDVR (e.g., where only two nDVRs of different data centers are grouped together as shown in FIG. 3) or may forward the current local capacity data to two or more capacity exchange servers (e.g., where three nDVRs of different data centers are grouped together as shown in FIG. 4). The capacity exchange server may forward the current local capacity data to as many other capacity exchange servers as are present in the group of nDVRs.

In step 503, the capacity exchange server may receive current remote capacity data from the one or more other capacity exchange servers. In step 504, the local capacity exchange server may combine current local capacity data with the current remote capacity data to generate a snapshot of the current network capacity. That snapshot may be made available to computing devices associated with the capacity exchange server (e.g., the channel monitors 305 and 404) as current network capacity data. The current network capacity data may be sent to the local computing devices reflecting updates. The current network capacity data may be sent in response to a request for the current network capacity data from those local computing devices. In step 504, the current capacity data may be made available to one or more computing devices of the local location. The computing devices may include the channel monitors, the media recorders, storage devices, and processors that consolidate and de-duplicate duplicate recordings, and the like.

In step 505, the local capacity exchange server may wait until the end of a heartbeat duration interval. The local capacity exchange server may again receive capacity information from other components in the nDVR in step 501. The heartbeat interval may be two seconds, six seconds, or other interval(s) shorter or longer than two seconds or six seconds. The heartbeat duration interval may reflect one or more time windows associated with one or more timers during which heartbeat signals from other capacity exchange servers are expected to be received.

Figure 5B:
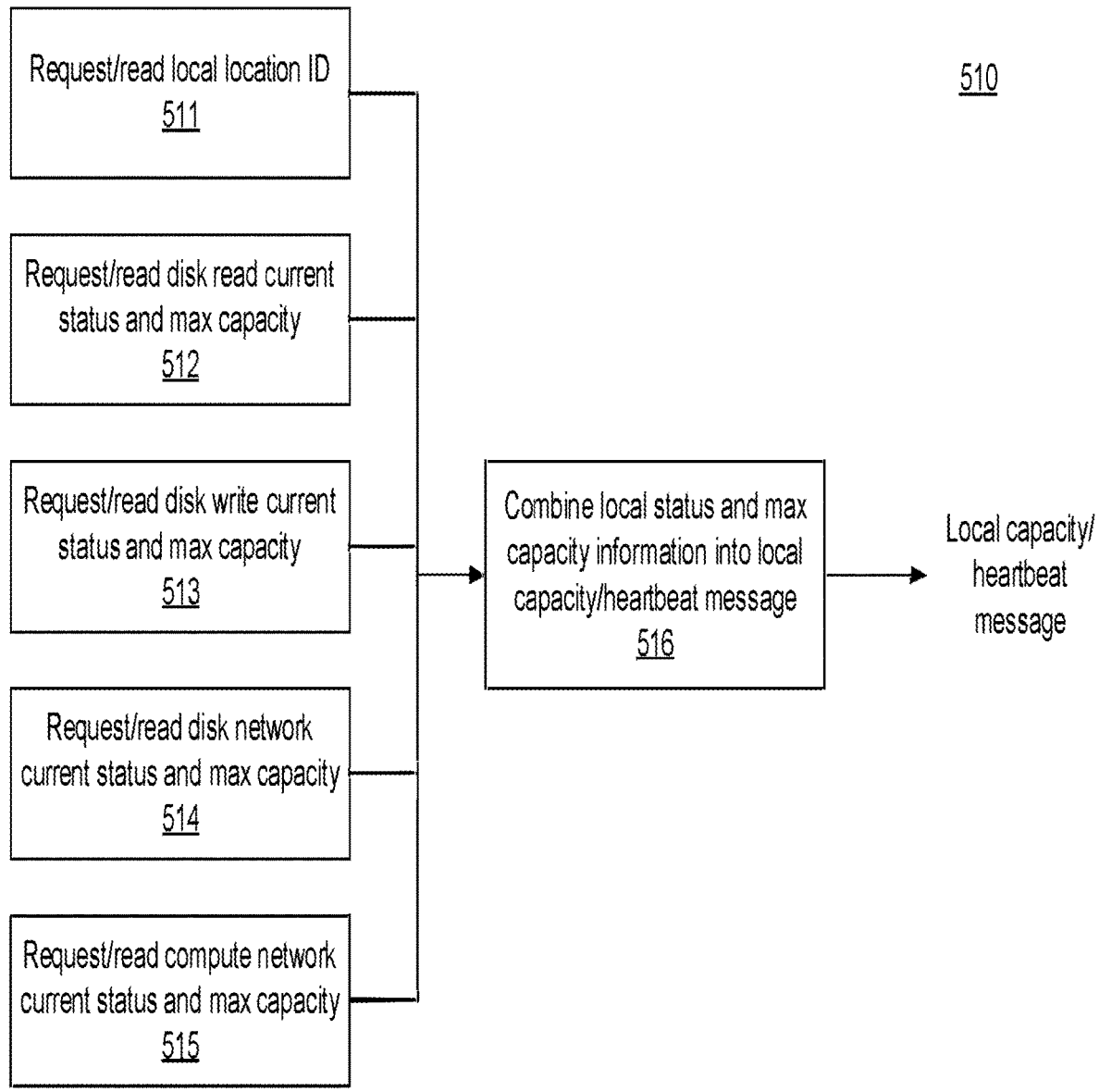
FIG. 5B is a flow chart showing an example method for combining capacity data.

FIG. 5B is a flowchart showing an example method 510 of combining status information into a local capacity/heartbeat message. A capacity exchange server may obtain local status information from channel monitors, media recorders, and/or media storage. The capacity exchange server may poll media recorders, storage devices, and/or servers for status information, and/or those devices may store their statuses in a local memory and the capacity exchange server may read the statutes from that local memory. In step 511, the capacity exchange server may obtain a location ID. The capacity exchange server may obtain statuses comprising one or more of current disk read activity (step 512), current disk write activity (step 513), current disk network activity (step 514), or current computational (processing load) activity (step 515). The capacity exchange server may also obtain a maximum capability for each nDVR comprising one or more of a maximum disk read activity, a maximum disk write activity, a maximum disk network activity, or a maximum computational (processing load) activity. The maximum capability may be obtained in the above steps 512-515 or may be obtained during a separate process. In step 516, the collected information may be combined by the capacity server into a local capacity/heartbeat message.

The local capacity/heartbeat message may be interpreted by remote capacity exchange servers as one or more of an indication of the local capacity of the nDVR to which the local capacity exchange server belongs and/or a heartbeat from the local capacity exchange server. Based on the local capacity/heartbeat message not being received by the remote capacity exchange servers within a predetermined period of time (e.g., 2 seconds), the remote capacity exchange servers may interpret the maximum capacities of the local nDVR to be zero (e.g., having no capacity).

The local capacity/heartbeat message may be part of or separate from other heartbeat messages between the capacity exchange servers. The local capacity/heartbeat message with the local capacity information may be sent on one timing interval (e.g., 4-6 seconds), while separate heartbeat messages may be sent on another timing interval (e.g., 2-3 seconds). The local capacity/heartbeat message may operate as a heartbeat message with separate interstitial (more frequent) heartbeat messages transmitted by the local capacity exchange server to the remote capacity exchange servers.

With respect to the heartbeat, one or more timers may be accessible by each capacity exchange server, one for each of the other capacity exchange servers. Based on receiving a heartbeat signal of one of the other capacity exchange servers, the timer associated with that capacity exchange server may be reset. The failure to receive a heartbeat from the other capacity exchange server before the expiration of the timer for that other capacity exchange server may be interpreted as the nDVR associated with the non-responsive capacity exchange server has no capacity to fulfil its recording tasks. The remaining nDVRs may determine whether they have the highest scoring location accounting for the reduced capacity of the network having temporarily lost connection with an nDVR.

The local capacity/heartbeat message may comprise an HTTP POST message with payload or other messaging techniques. The following shows non-limiting examples of content of such a capacity exchange/heartbeat message in pseudo-code:

POST/capacity
{
"kind": "Heartbeat",
"time": "2015-08-22T13:57:24Z",
"Location": "cdvr-x-rmID-abrn01",
"DiskRead" {"Now": 0, "Max":8000000},
"DiskWrite" {"Now": 0, "Max":8000000},
"DiskNetwork": {"Now": 0, "Max": 16000000},
"ComputeNetwork" {"Now": 0, "Max": 16000000}
}

The capacity heartbeat message shown above is an HTTP Post command indicating itself in the header to be a capacity-related message. The capacity heartbeat message may indicate itself to be a "heartbeat" message with the "kind" attribute. The time of generation may be included with the "time" attribute. The location or name of the nDVR may be referenced with the "location" attribute. A current playback status ("Now") and maximum playback capacity ("Max") may be provided with the "DiskRead" attribute. A current recording status ("Now") and maximum recording capacity ("Max") may be provided with the "DiskWrite" attribute. A current internal network load ("Now") and maximum capacity ("Max") may be provided with the "DiskNetwork" attribute. A current processor load ("Now") and maximum capacity ("Max") may be provided with the "ComputeNetwork" attribute. Values for the "Now" and "Max" parameters the "DiskRead" attribute, "DiskWrite" attribute, "DiskNetwork" attribute, and/or "ComputeNetwork" attribute may be in segments per unit of time.

The exchange of capacity information may be a heartbeat signal such as shown with respect to the pseudocode above. Additionally or alternatively, heartbeat information may be provided separately from capacity information. In slowly varying systems or in systems with significant capacity, capacity updates may not be needed as often compared to either quickly varying systems or to systems with reduced capacity. Accordingly, heartbeat signals may be provided independent from or in addition to less frequent capacity exchanges.

Figure 6:
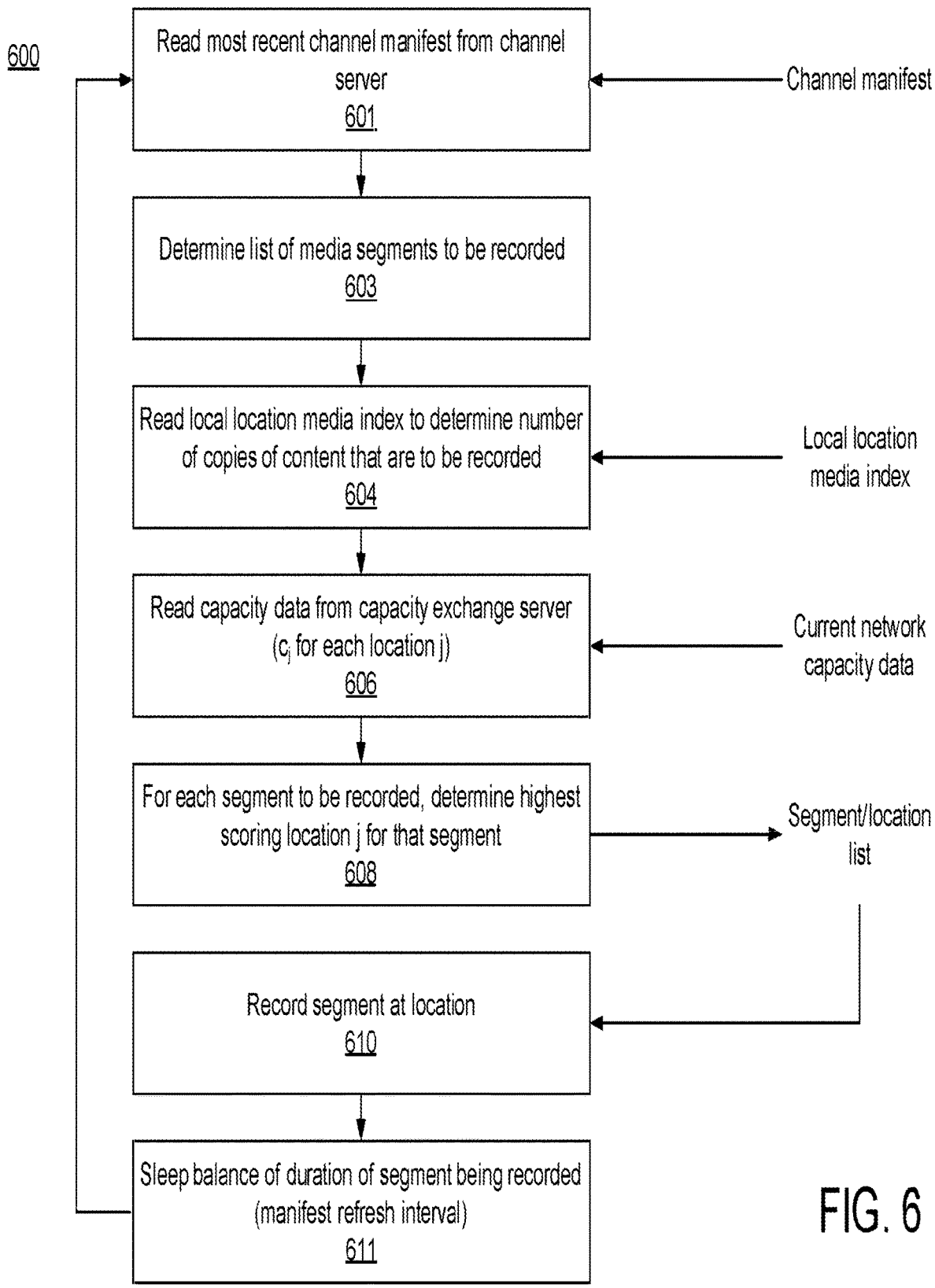
FIG. 6 is a flow chart showing an example method for determining where to record segments.

FIG. 6 is a flowchart showing an example of a method by which a local nDVR may determine which segments to record. The flowchart of FIG. 6 is described in relation to the environment of FIG. 3 but may equally be applied to the environment of FIG. 4 and environments having more data centers. With respect to FIG. 3, the device 303 may request recording of "The Walking Dead" when that content item next appears on the AMC channel. The request may be provided to a specific channel monitor 305 that monitors the AMC channel for the content to be recorded. The content may be provided by a channel server. The specific channel monitor 305 may receive the designation of what to record from one or more servers along with an indication of how many copies of the content should be recorded. The one or more servers providing the indication of how many copies to record may comprise one or more guide scheduling servers (e.g., the guide scheduling server 1607 of FIG. 16). The channel monitor 305 monitoring the AMC channel may read a channel manifest from the AMC channel server. The channel manifest from the AMC channel server may be the current content available on the AMC channel during a predetermined interval (e.g., during a 2 second interval). Further, the channel manifest may indicate a single resolution version (e.g., 1080p) of the content or may indicate multiple resolution versions of the content (e.g., one or more of 288p, 360p, 432p, 720p, or 1080p).

In step 601 of FIG. 6, the channel monitor may read a most recent channel manifest from a channel server. The channel monitor may read from the channel manifest that "The Walking Dead" is playing for the next 2 seconds at 5 separate resolutions. In step 603, the channel monitor may determine the list of segments to be recorded (e.g., 5 separate segments). Comparing a channel manifest with the list of content to be recorded, the channel monitor (in step 603) may determine the list of segments to be recorded. The AMC channel monitor may compare a list of segments to be recorded to the current channel manifest from AMC and may detect a match with a current segment of "The Walking Dead". In step 604, the channel monitor may read a local location media index. The local location media index may specify the quantity of copies to be recorded for the specific content (e.g., the local location media index may indicate that 205 copies of the content should be recorded). The quantity of copies of segments to be recorded may be the same as the quantity of requests for the content as related to a default resolution (e.g., 1080p). The quantity of copies of segments to be recorded may indicate the recording of two or more resolutions of the content per user request to permit playback on different devices in the native resolution of each device. For example, if 205 users requested recording of "The Walking Dead" and five resolutions are offered in the channel manifest, 1025 segments may be indicated to be recorded.

In step 606, the channel monitor may read current network capacity data (e.g., capacity data for multiple nDVRs) from the local capacity exchange server. The following pseudocode shows an example format for a request of capacity (the "GET/capacity" command) and an example of a response providing the current data (e.g., the response content between the outer curly braces) reflecting an aggregated capacity report of multiple nDVRs:

GET Command:
GET/capacity
Response:
{
"kind": "Capacity",
"time": "2015-08-22T13:57:24Z",
"Locations": [
{
"Location": "cdvr-x-rmID-mana01",
"DiskRead": {"Now": 0, "Max": 1000000},
"DiskWrite": {"Now": 0, "Max": 1000000},
"DiskNetwork": {"Now": 0, "Max": 16000000},
"ComputeNetwork": {"Now": 0, "Max": 16000000}
},
{
"Location": "cdvr-x-rmID-abrn01",
"DiskRead": {"Now": 0, "Max": 8000000},
"DiskWrite": {"Now": 0, "Max": 8000000},
"DiskNetwork": {"Now": 0, "Max": 16000000},
"ComputeNetwork": {"Now": 0, "Max": 16000000}
}
]
}

The aggregate capacity report may be based on an HTTP Get command where the information being retrieved relates to capacity. The "kind" attribute may indicate that the response relates to the aggregate capacity of the system. The "time" attribute may indicate the time at which the report was generated. The "Locations" section of the report may relate to indicating the capacity of the specific locations of the capacity exchange servers. For each of the locations indicated, the name of the location may be provided with the "Location" attribute. A current playback load ("Now") and a maximum capacity ("Max") at that specific location may be provided with the "DiskRead" attribute. A current recording load ("Now") and a maximum capacity ("Max") at that specific location may be provided with the "DiskWrite" attribute. A current internal network load ("Now") and a maximum capacity ("Max") for the location may be provided with the "DiskNetwork" attribute. A current processor load ("Now") and a maximum capacity ("Max") for the location may be provided with the "ComputeNetwork" attribute. Values for the "Now" and "Max" parameters the "DiskRead" attribute, "DiskWrite" attribute, "DiskNetwork" attribute, and/or "ComputeNetwork" attribute may be in segments per unit of time, groups of segments per unit of time, and/or other units.

The capacity for connected nDVRs may be represented by C. The capacity for each by c for each nDVR j may be represented by c. The capacity C across the network may be represented by the following equation:

$$C = \sum_{0}^{j} c_j \qquad (1)$$

where C is the sum of the capacities c of individual nDVRs 0-j.

In step 608, the channel monitor may determine, for each segment to be recorded, the highest scoring nDVR j for that segment to be recorded. The scoring may be based on the aggregate capacity report or a combination of the aggregate capacity report and the sum C of capacities.

The determination of the highest scoring nDVR j for a segment may be performed irrespective of the resolution of the segment. Additionally or alternatively, each resolution of the segment may be used in the scoring of each segment (e.g., a first nDVR may be a preferred recording location for a first resolution of the segment while a second nDVR may be a preferred recording location for a second resolution of the segment). Additionally or alternatively, one or more of the different resolutions of the segments may be recorded at a common recording location.

The channel monitor (e.g. a channel monitor server 305) may output a list of individual segments and local media recorder server(s) (e.g. one or more of media recorder servers 306) to record the segments. In step 610, the designated local media recorder servers may record the segments. In step 611, the channel monitor may wait until the channel manifest is refreshed and may read the next channel manifest in step 601.

The scoring performed by the channel monitor in step 608 may be performed locally in each channel monitor in each nDVR based on information distributed to each nDVR, the information comprising the channel manifest, the local location media index, and the current network capacity data. By permitting one or more nDVRs to determine the highest scoring location j for each segment to be recorded across the network of data centers, the robustness of the recording ability of the combination of nDVRs working across the data centers may be enhanced. In an environment in which all nDVRs may be sharing capacity data, each nDVR may be determining the same highest scoring location per segment. However, in an environment where one of the nDVRs may be partitioned from two or more other nDVRs, the first nDVR may attempt to compensate for the zero capacity (from its perspective) other nDVRs. Likewise, the other two nDVRs may attempt to compensate for the zero capacity (from their perspective) of the first nDVR. Additionally or alternatively, the scoring may be performed in other channel monitors and the information shared among the channel monitors.

Additional location information may be included in the heuristics of step 608 to prioritize, for a determination of where to record a segment, one nDVR over other nDVR(s). Additionally or alternatively, the additional location information may be included to prioritize, for determination of archiving and/or subsequent reconstitution of segments, one nDVR over other nDVR(s).

FIGS. 7A-7C show information that may be used in determining at which location segments should be recorded, archived, and/or reconstituted. Various types of information are shown in FIGS. 7A-7C for scoring the nDVRs in different data centers. These information sets are examples. Information in these information sets may be replaced with other information and/or augmented with other information.

FIG. 7A shows information 701 comprising a preferred location 704 where content for a given channel may be recorded. The preferred location 704 may be general to all resolutions for a channel or may be specific to particular resolutions for that channel. In systems with only two nDVRs, only a primary location may be indicated or both the primary location and the secondary location may be indicated. In systems with three or more nDVRs, a primary location and a secondary location (and possibly a tertiary location and/or others) may be indicated to provide an ordered list of locations in case one or more of the locations may be unavailable. The closest server to a user or a group of users may be provided as information 705. The users may be grouped to help reduce overhead calculations by indicating locations for all users who are members of a group. For example, users 1-500 who record content from the AMC channel may have their closest nDVR be different than users 501-1000 who also record content from the AMC channel. The quantity of users per group may be variable and may be readily increased or decreased per the capacity of the network.

The least loaded nDVR may be indicated in information 706. Information 706 may comprise disk writes capacity, disk network capacity, and/or compute network capacity. Disk read capacity may be of less importance during recording. The location where the previous segment was recorded may be indicated in information 707.

FIG. 7B shows information 702 that may be considered in determining where segments should be archived. Information 708 may comprise an indication of a designated archive location (general per channel and/or specific for channel/resolution). Information 709 may indicate the closest server to a user or a group of users. The least loaded nDVR may be indicated in information 710. The location where the previous segment was recorded may be indicated in information 711.

FIG. 7C shows information 703 that may be considered in determining where segments should be reconstituted. Information 712 may comprise an indication of the archived location of the segment. Information 713 may indicate the closest server to a user or a group of users. The least loaded nDVR may be indicated in information 714. Other information (including possible biasing for expected future network loads) may be indicated in information 715.

FIG. 8 shows an example of a general timeline of archiving and reconstituting segments. For days 0-3 after recording, the recordings may be played back from an active server. After day 3, the content may be archived and subsequently reconstituted on days 3+ for playback from an active server. Time intervals longer or shorter than 3 days may be used to determine when recordings should be archived.

Figure 9:
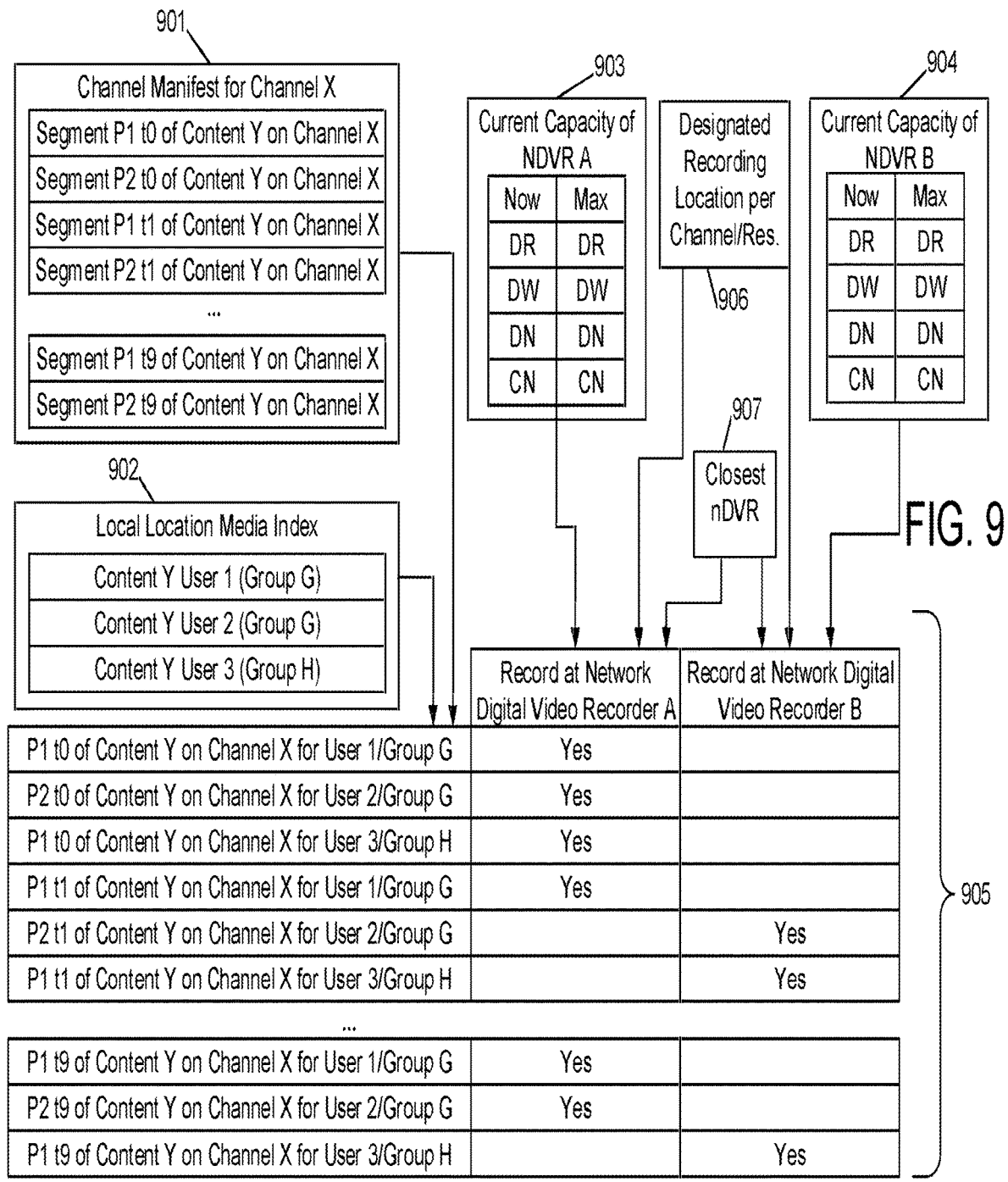
FIG. 9 shows examples of information used to determine the recording locations in the timeline of FIG. 8.

FIG. 9 shows an example of a channel manifest 901 for a channel X with segments of content Y, having resolution P1 and P2, for times t0-t9. A local location media index 902 may indicate the content requested by specific users. In FIG. 9, three users of two different groups of users have requested content Y (e.g., a user 1 of a Group G, a user 2 of the Group G, and a user 3 of a Group H).

Capacity information for an nDVR A 903 and capacity information for an nDVR B 904 may be gathered, may be exchanged between the nDVR A's capacity exchange server and nDVR B's capacity exchange server, and may be stored by each nDVR's capacity exchange server. The capacity information for each nDVR may comprise current usage and maximum usage capabilities for one or more of the following: disk reads (DR), disk writes (DW), disk network load (DN), or computational network load (CN). Information 906 may indicate the designated recording location per channel/resolution. Information 906 may be provided, for a given nDVR, from the nDVR's capacity exchange server to the nDVR's channel monitor. Information 907 may indicate the closest nDVR per user or group of users. Information 907 may be provided, for the given nDVR, from the nDVR's capacity exchange server to the nDVR's the channel monitor.

Based on one or more of the channel manifest 901, the local location media index 902, the capacities of nDVRs A (903) and B (904), the designated recording location per channel/resolution 906, or the closest nDVR per a user or group of users 907, the given nDVR's channel monitor may score the locations for recording the particular segments in a table 905. The results of table 905 may be sent to the given nDVR's media recorder server as a segment/location list of FIG. 6.

Figure 10:
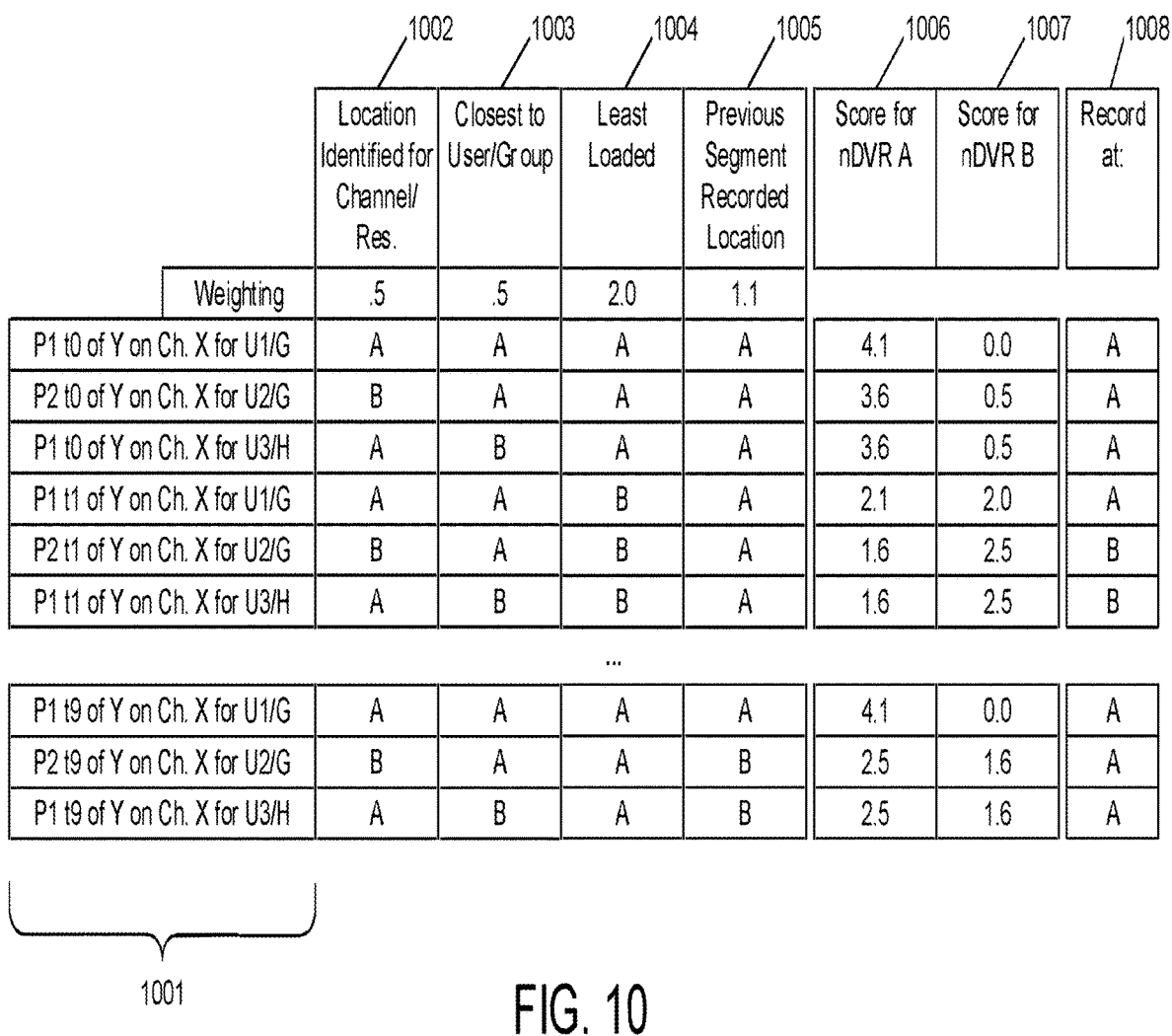
FIG. 10 shows examples of values and weighting factors used to determine where to record segments.

FIG. 10 shows an example of weighted, additive scoring that may be used in conjunction with step 606 of FIG. 6. Other scoring processes may be used in addition to or in place of that shown in FIG. 10. FIG. 10 shows a list of segments 1001 at resolutions P1/P2 at times t0-t9 on channel X for the users 1 and 2 of the Group G and the user 3 of the Group H. The nDVR location indicated for recording the channel per resolution may be indicated in the column 1002. The nDVR closest to the user/group may be indicated in the column 1003. The least loaded nDVR may be indicated in the column 1004. The location where previous segment was recorded may be indicated in the column 1005. The weighting factors that have been applied in this example comprise 0.5, 0.5, 2.0, and 1.1, respectively. These weighting factors are indicated for explanatory purposes only and may be varied to adjust the scorings to alter the distributions of resulting locations as needed. The sums of weighted values for the nDVR A may be indicated in the column 1006 and the sum of weighted values for the nDVR B may be indicated in the column 1007. The recording location for each of the segments 1001 may be the recording location with the higher score of column 1006 and column 1007. The recording location with the higher score may be represented in the column 1008.

In FIG. 10, the nDVR A may be designated as the primary recording location of segments with resolution P1 while the nDVR B may be designated as the primary recording location of segments with resolution P2. The least loaded nDVR may initially be the nDVR A, may shift to the nDVR B for time t1, and may return to the nDVR A for time t9. The primary weighting factor in FIG. 10 may be the least loaded nDVR indicated in the column 1004. For t1, despite the previous recordings of the segment having been recorded by nDVR A, the segment P2 for the User 2/Group G and the segment P1 for the User 3/Group H may be recorded by the nDVR B based on the combination of the nDVR B being least loaded and one of the location indicated for recording (the column 1002) and the closest nDVR (the column 1003) being the nDVR B. The score for the remaining segments are all indicating the nDVR A as the recording location.

The weighting factors of each of the values may be constant or may vary over time. The weighting factors may be based on events happening in the current network. The weighting factors may be varied to bias a recording capacity for a given nDVR ahead of an anticipated capacity shift based on historical capacity information. Additionally or alternatively, the heuristics may be tied to user content selections (e.g., recording content from a sporting event that does not occur on a short window (for example, weekly, bi-weekly, semi-monthly, monthly, and the like) basis—such as the Olympics held in another time zone). Capacity information may be biased ahead of time to limit the expected recording capability, thereby providing less capacity to other capacity exchange servers and providing more capacity for the local nDVR during expected spikes in upcoming recording requests.

A state of a first nDVR being off-line or no longer communicating with other nDVRs may be referred to as being "partitioned" from the other nDVRs. While the first nDVR may be under partition (not able to send its heartbeat signal to other nDVRs), the remaining nDVRs may compensate for the unavailable nDVR by recording specific segments originally determined to be recorded by the first (now unavailable) nDVR. Based on the first nDVR being available again, the segments recorded by other nDVRs may be consolidated and stored in a storage device of the first nDVR. Duplicate recordings of segments for the same user may be removed at a later time.

Archiving, reconstitution, and/or playback systems may also use the capacity exchange servers to determine the location with the best capacity to archive, reconstitute, and/or play back recorded content. Each of these systems may implement its own load balancing heuristic using capacity data from its local capacity exchange server.

A single nDVR under partition may function (if, in fact, functioning) as it would without a capacity exchange server in that only local status information is considered for recording, playback, archiving, and/or reconstitution. Until the partition is removed (e.g., a connection is restored between the affected nDVR and one or more additional nDVRs), specific media files originally intended to be recorded on a local nDVR but recorded elsewhere may not be able to be played. Based on the nDVR no longer being partitioned, the recorded content may be moved from the other nDVR to the local nDVR for archiving and/or playback.

Recovery from a partition may be achieved by replicating the metadata indexes indicating where the recorded content may be stored until the metadata indexes agree. Playback may initiate from either system, with the media fragment retrievals coming from the system where the media may reside and being consolidated and/or archived at a designated nDVR.

If a partitioned nDVR was active under partition, identical segments may have been recorded by the partitioned nDVR and another nDVR. If one copy of each recording per requesting user is desired, the various segments may be consolidated into the single recording per requesting user. Based on connectivity or capability being restored, the nDVRs may exchange metadata indexes and use the exchanged metadata indexes to de-duplicate recorded segments to result in a single copy of content per requesting user.

Each capacity exchange server may treat its own one or more channel monitor servers, one or more media recorders, metadata indexes, and media storage as a single entity for reporting capacity information to the other capacity exchange servers. Each capacity exchange server may treat each of these components separately and/or report them separately. Subgroups of components may be consolidated to reduce the reporting overhead for each capacity exchange server. Based on a given capacity exchange server determining that its own media storage is offline, it may report that its nDVR has low or no maximum disk read or disk write capacity. Additionally or alternatively, the capacity exchange server may not forward a heartbeat signal, thereby forcing the other capacity exchange servers to determine that the nDVR (to which the given capacity exchange server belongs) may likely be offline.

With respect to consolidating recordings, there may be a benefit of keeping recordings for a given channel in one data center. Organizing the recordings by channel in one data center (e.g., a primary location for the content from each channel) may make deduplication easier by not having to send the content between data centers but only move the content locally (if at all) to consolidate the recorded segments.

Figure 11:
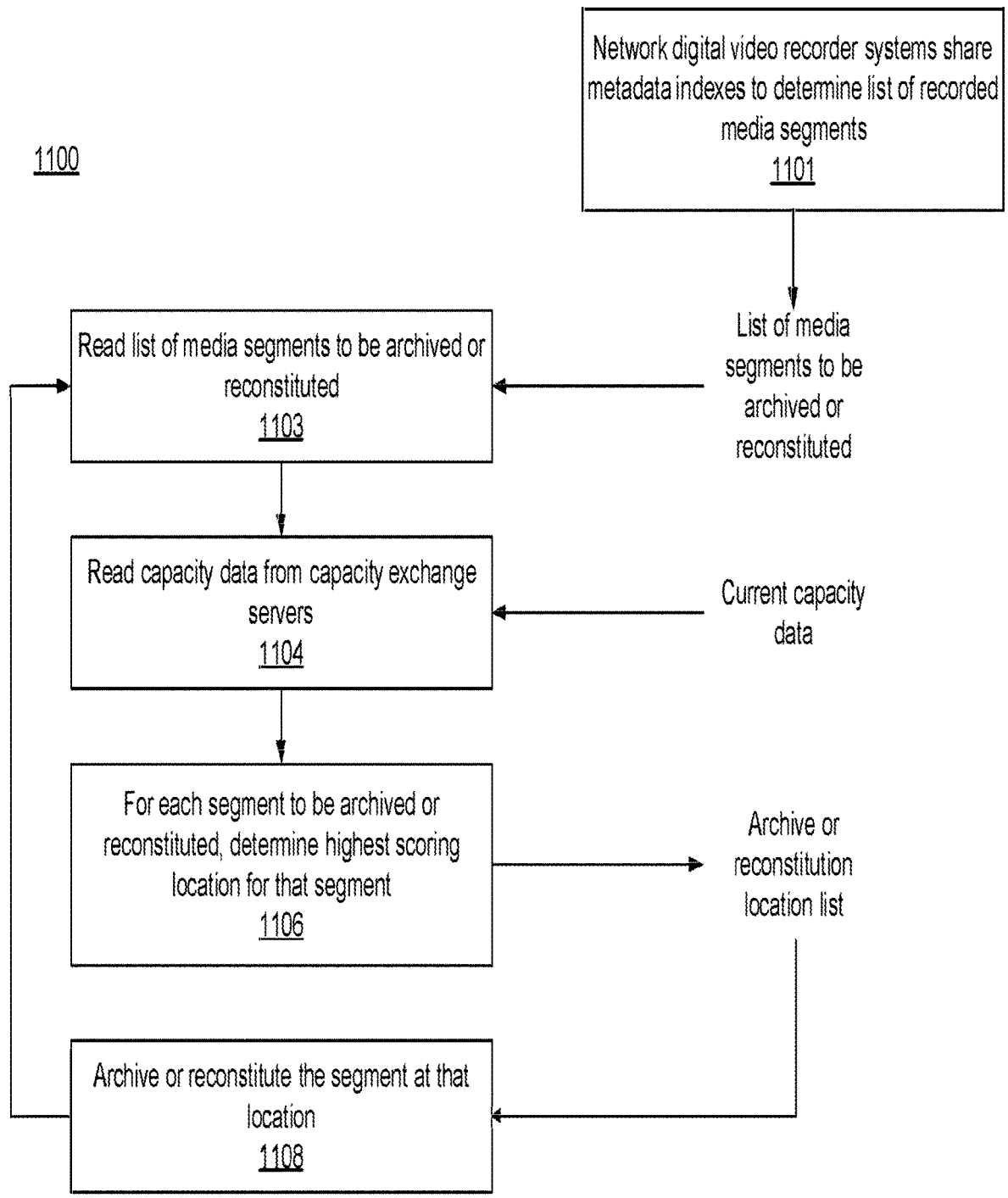
FIG. 11 is a flow chart showing an example of a method for archiving and/or reconstituting segments.

FIG. 11 is flowchart showing a method for determining where to archive recorded segments and/or where to reconstitute archived segments. At day 3 (or other time period after recording), segments may be archived. Another measure of time may be used including but not limited to seconds, minutes, hours, weeks, months, and the like and fractions thereof. Based on a request for playback from a user, the archived segments may be reconstituted at an active server for playback. In step 1101, the nDVRs may share metadata indexes to determine the locations of recorded segments and the existence of duplicate recorded segments. The list of segments to be archived or reconstituted may be generated and may be distributed among the nDVRs. Additionally or alternatively, as each nDVR exchanges the metadata indexes, each may generate its own copy of the lists of segments to be archived or reconstituted.

In step 1103, the local nDVR may read the list of the segments to be archived or reconstituted. In step 1104, the local nDVR may read capacity data from its capacity exchange server that stores the capacity data from across the network. In step 1106, for each segment to be archived or reconstituted, the local nDVR may determine the highest scoring location for that segment and may store that value in an archive location list. Because the nDVRs may all be performing step 1106 locally, they may each determine the highest scoring location for that segment. Where an nDVR determines itself to be the highest scoring location for that segment, the segment may be archived or reconstituted by that nDVR (step 1108). This may comprise sending segments stored in a different nDVR to the indicated nDVR as well as deleting duplicate recordings of segments. Some segments for the user of the same content may have been recorded at multiple locations based on one nDVR appeared to be offline or suffering from reduced capacity.

Figure 12:
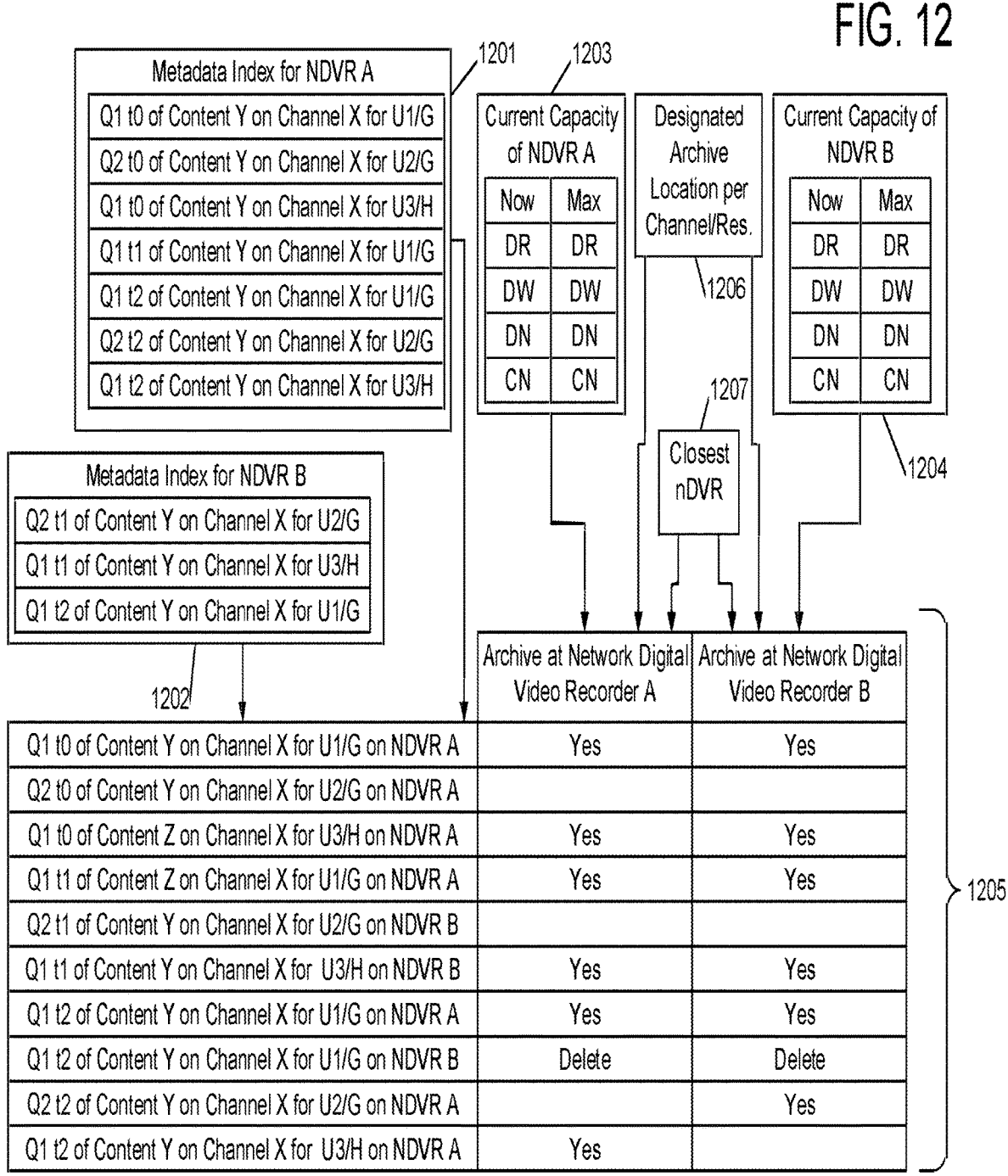
FIG. 12 shows examples of information used to determine where to archive the segments of FIG. 11.

FIG. 12 shows examples of information that may be used to determine where to archive the segments of FIG. 11 across nDVRs. A metadata index 1201 for an nDVR A of recorded segments may be combined with a metadata index 1202 for an nDVR B to generate a list 1205 indicating the recorded segments and where they are currently located.

Current capacity information 1203 of the nDVR A and current capacity information 1204 of the nDVR B may be exchanged via respective capacity exchange servers. The designated archive location per channel/resolution may be provided as information 1206. Information indicating the closest nDVR per user/group may be provided as data 1207. The scores of rankings for where to store the segments may be determined and the results may be populated into the list 1205.

The segment Q1 for time t2 for the User 1/Group G may have been recorded by both the nDVR A and the nDVR B. Based on the determination that the segment is to be archived by the nDVR A, the copy on the nDVR B may be indicated as to be deleted.

FIG. 13 shows an example of weighted, additive scoring that may be used in conjunction with step 1106 of FIG. 11. Other scoring processes may be used in addition to or in place of that shown in FIG. 13. FIG. 13 shows a list of segments 1301 at resolutions Q1/Q2 at times t0-t2 on a channel Y for the users 1 and 2 of the Group G and the user 3 of the Group H. The nDVR location indicated for archiving the channel per resolution may be indicated in the column 1302. The nDVR closest to the user/group may be indicated in the column 1303. The least loaded nDVR may be indicated in the column 1304. The previous segment's recorded location may be indicated in the column 1305. The weighting factors that applied in this example are 1.5, 0.5, 0.5, and 0.1, respectively. These weighting factors are indicated for explanatory purposes only and may be varied to adjust the scorings to alter the distributions of resulting locations as needed. The sums of weighted values for the nDVR A may be indicated in the column 1306 and the sum of weighted values for the nDVR B may be indicated in the column 1307. The archiving location for each of the segments 1301 may be the archiving location with the higher score of column 1306 and column 1307. The archiving location with the higher score may be represented in the column 1308.

In FIG. 13, an nDVR A may be designated as the primary archiving location of segments Q1 while an nDVR B may be designated as the primary archiving location of segments Q2. The least loaded nDVR may initially be the nDVR A, may shift to the nDVR B for time t1, and may return to the nDVR A for time t2. The primary weighting factor in FIG. 13 may be the designated archive location of the column 1302. The archiving of the segments may follow that designated archive location.

Figure 14:
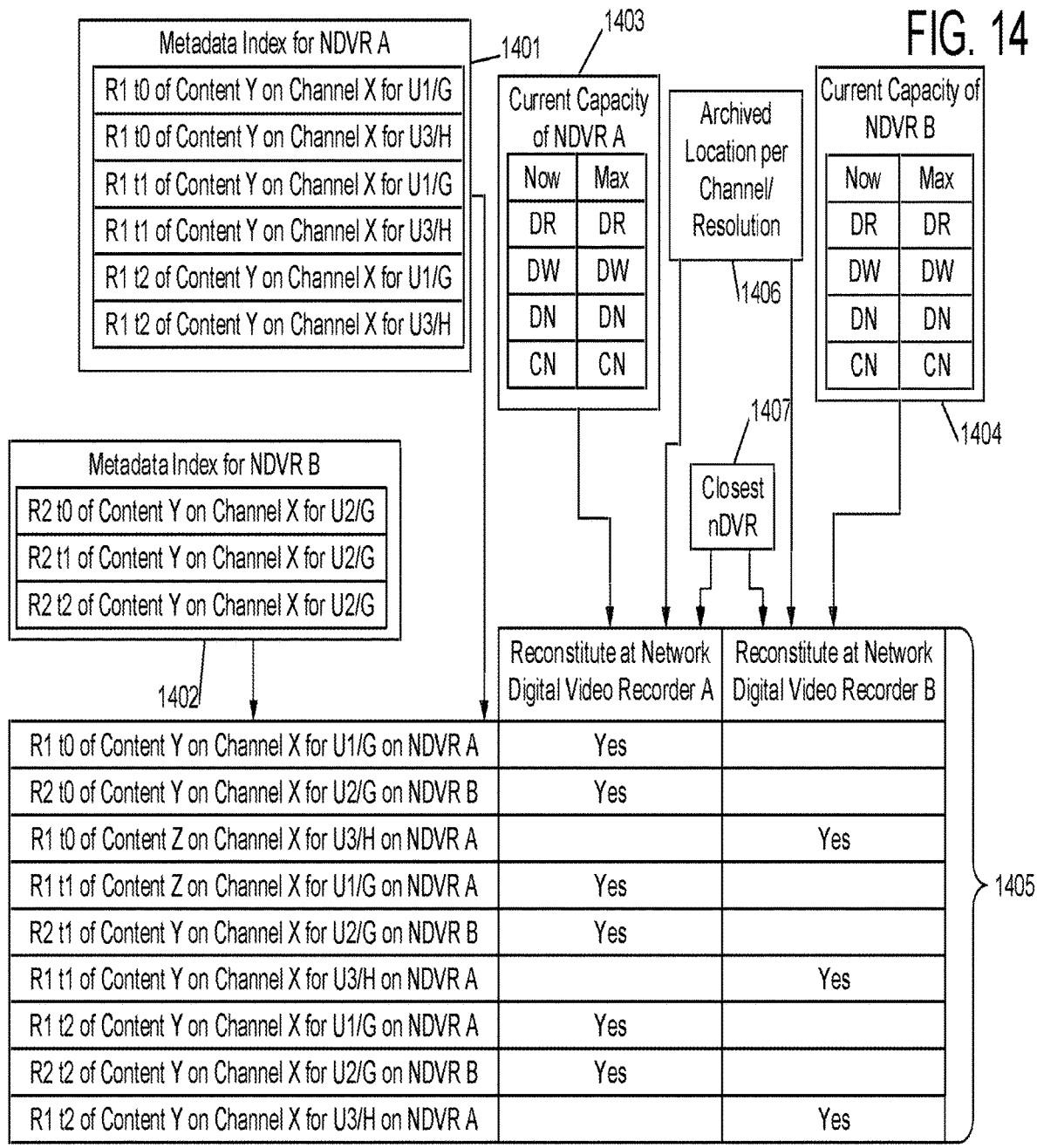
FIG. 14 shows examples of information used to determine where to reconstitute the segments of FIG. 11.

FIG. 14 shows examples of information that may be used to determine where to reconstitute content across nDVRs. A metadata index 1401 for an nDVR A of recorded segments may be combined with a metadata index 1402 for an nDVR B to generate a list 1405 indicating the archived segments and where they are currently archived.

Current capacity information 1403 of the nDVR A and current capacity information 1404 of the nDVR B may be exchanged via respective capacity exchange servers. The designated reconstitution location per channel/resolution may be provided as information 1406. Information that identifies the closest nDVR per user/group may be provided as data 1407. The scores of rankings for where to reconstitute the segments may be determined and the results populated into the list 1405.

FIG. 15 shows an example of weighted, additive scoring method that may be used in conjunction with step 1407 of FIG. 14. Other scoring processes may be used in addition to or in place of that described in FIG. 15. FIG. 15 shows a list of segments 1501 at resolutions R1/R2 at times t0-t2 on the channel X for the users 1 and 2 of the Group G and the user 3 of the Group H. The nDVR location indicated for archiving the channel per resolution is indicated in the column 1502. The nDVR closest to the user/group may be indicated in the column 1503. The least loaded nDVR may be indicated in the column 1504. Other information may be indicated in the column 1505. Other information may comprise a probability of expected actual watching a recording or other probabilities. The weighting factors in FIG. 15 comprise 0.5, 1.6, 0.5, and 0.1, respectively. These weighting factors are provided for explanatory purposes only and may be varied to adjust the scorings to alter the distributions of resulting locations as needed. The sums of weighted values for the nDVR A may be indicated in the column 1506 and the sum of weighted values for the nDVR B may be indicated in the column 1507. The reconstitution location for each of the segments 1501 may be the reconstitution location with the higher score of column 1506 and column 1507. The reconstitution location may be represented in the column 1508.

In FIG. 15, the nDVR A may be designated as the primary reconstitution location of segments having resolution R1 while the nDVR B may be designated as the primary archiving location of segments having resolution R2. The least loaded the nDVR may initially be the nDVR A, may shift to the nDVR B for time t1, and may return to the nDVR A for time t2. The primary weighting factor in FIG. 13 may be the closest nDVR to the user/group of the column 1503. The reconstitution of the segments may follow that closest to user/group location of the column 1503.

Figure 16:
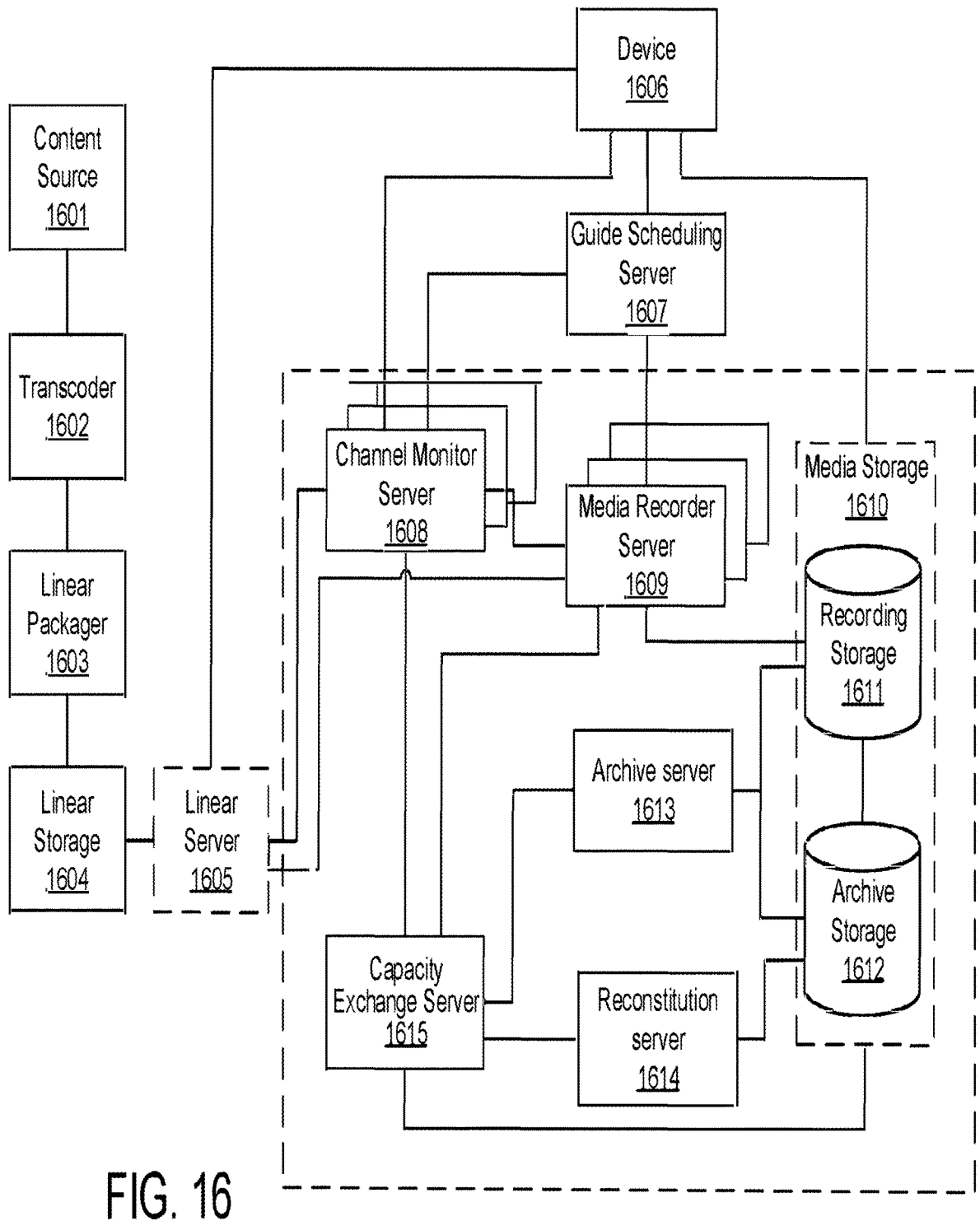
FIG. 16 shows an example nDVR system with a capacity exchange server.

FIG. 16 shows a block diagram of an example nDVR, such as those as shown in FIGS. 3 and 4, with additional components. FIG. 16 shows an example of a system, such as a cloud or network DVR system, by which a service provider, such as, but not limited to, a cable television service provider, may receive a request to record content, store the requested content, and potentially fulfill a request to deliver the requested content for playback. The request to record a content item may be received from a device 1606 and the requested content item may be delivered to the device 1606 for playback. As used herein, the device 1606 may refer to a hardware element (such as a set-top cable box, a streaming-video player, a quadrature amplitude modulation (QAM) client, and/or other computing device) or a software element (such as a web browser or other software adapted to playback video). The device 1606 used to request that the content item be recorded in the system may be distinct from the device 1606 used to receive the recorded content item for playback. For example, a user may use his or her set-top cable box to request that a particular content item be recorded, but may later request and playback the content item with software running on his or her smart phone. The device 1606 may be connected to the system via any suitable network, which may comprise a cable network, satellite network, and/or the Internet.

The system may comprise a guide scheduling server 1607. The guide scheduling server 1607 may receive and fulfill a request from the device 1606 of a user to deliver a recorded content item to the device 1606 for playback. The request from the device 1606 to deliver the content item may comprise identifications of the user (e.g., an account identifier, a username and/or a password), the device 1606, the requested content item, and/or a playback time point or temporal location (e.g., the start of content or the 12:30 mark in a 30:00 minute content item). The request to deliver the content item may reflect a user skipping to a particular portion of content of which the initial segments of the content item have already been delivered and are being played on the device 1606. A user may have started viewing the first minute of content and may have decided to skip to a midway point of the content item. In this case, the request to deliver the content item may indicate that the device 1606 required the segments of the content item from that midway point and the remaining portion of the content item. Based on receiving a request to deliver a content item to the device 1606, the guide scheduling server 1607 may provide one or more manifest files to the device 1606 that describe the content item and segments thereof, comprising network locations from which each segment may be downloaded. Using the manifest file, the device 1606 may iteratively download the segments comprising the content item. The device 1606 may download sufficient segments of the content item, and the device 1606 may begin playback of the content item.

The system may comprise a transcoder 1602. The transcoder 1602 may receive content from a content source 1601. The content item may be in any one of a variety of formats, such as H.264, MPEG-4 Part 2, or MPEG-2 or other formats. The transcoder 1602 may convert the content item from one video format to another video format, such as one amenable to the means by which the service provider's users view the content. The transcoder 1602 may additionally segment the content item into a plurality of segments. Content may be segmented into a series of 2-second segments or other segments of a period of time.

The transcoder 1602 may be in communication with a linear packager 1603 and a linear storage 1604. The linear packager 1603 and the linear storage 1604 may be in communication. The linear packager 1603 and linear storage 1604 may refer generally to one or more interconnected servers, storage devices, logical elements, and the like. The content stored in linear storage 1605 may be served to requesting devices via linear server 1605.

The linear packager 1603 may receive the content item from the transcoder 1602. The linear packager 1603 may determine how the content item is to be segmented and put together for delivery to and eventual playback by the device 1606. As part of this process, the linear packager 1603 may segment the content item (such as in the event that the content item has not yet been segmented) or may re-segment the content item (such as in the event that the content item had been previously segmented). The linear packager 1603 may additionally insert one or more cues or markers into the segments at which one or more additional segments, such as segments comprising an advertisement, may be inserted by an upstream client, server, or logical module, such as the device 1606 or the media recorder server 1609.

The linear packager 1603 may generate a manifest file associated with the content item. Generally, a manifest file may contain information describing various aspects of the associated content item that may be useful for the device 1606 to playback the content item and/or for the media recorder server 1609 to store and retrieve the content item. A manifest file may indicate the segments comprising the content item, the length of each segment, the quantity of segments, and/or the proper ordering of the segments necessary to allow a playback of the content item. A manifest file may further comprise a network location (e.g., a hypertext transfer protocol (HTTP) uniform resource locater (URL) link or other universal resource identifier (URI)) for each segment from which the segment may be downloaded, accessed, or retrieved. The network location may indicate a location on the linear storage 1604 or recording storage 1611. The network locations included within a manifest file may point to more than one different location or source. The network location for segments corresponding to the content item may reference a location on the linear storage 1604 while the network location for segments corresponding to an inserted advertisement may reference a location from outside the system. A manifest file may describe multiple versions (e.g., different quality levels) of the content item and may comprise corresponding information on those segments. A manifest file may be provided, such as by the guide scheduling server 1607, to the device 1606 in response to a request to receive content recorded within the system. The device 1606 may use the manifest file to determine the segments required to play the content item or a portion of the content item and subsequently download the required segments using the network locations specified in the manifest file.

The content item or portions thereof may be stored in the linear storage 1604, which may be accessed by the device 1606 directly or indirectly via the recording server 1609 to deliver the content item to the device 1606. The linear storage 1604 may comprise one or more data storage devices, such as volatile memory (e.g., random access memory (RAM)), a hard disk drive, a network-attached storage (NAS), and/or a storage area network (SAN) in which the content item or portions thereof may be stored.

A media recorder server 1609 may be in communication with the channel monitor server 1608. The media recorder server 1609 may serve to coordinate the generation and retrieval of unique duplicate content item recordings. In particular, the media recorder server 1609 may coordinate the simultaneous generation of multiple duplicate content item recordings of one or more content items. This coordination may be based on a minimum quantity of users having requested recording of a particular content item. The media recorder server 1609 may receive one or more requests from devices 1606 to record content. The request to record content may comprise identifications of the user (e.g., an account identifier, a username, and/or a password), the device 1606, the content item, the station/channel, the linear stream (from the linear storage 1604 and/or from the linear server 1605), the start time of the content item, and/or the end time of the content item. Based on receiving a request to record content, the media recorder server 1609 may access a copy of the segments from one or more of the channel monitor server 1608, the linear packager 1603, and/or the linear storage 1604. The media recorder server 1609 may prepare to store a recording of the content item in a recording storage 1611. The recording storage 1611 may comprise one or more storage devices, such as a hard disk drive, a network-attached storage (NAS), and/or a storage area network (SAN).

The media recorder server 1609 may comprise a plurality of media recorder servers (shown as stacked servers behind media recorder server 1609), which may each represent a pool of resources available to independently perform a recording task, such as writing copies of a segment to the recording storage 1611. A higher level media recorder server (a first of media recorder servers 1609) may oversee the operations of lower media recorder servers (second and subsequent media recorder servers 1609) to track and maintain the status of each of the lower media recorder servers. The higher media recorder server may, at any given time, know which lower media recorder servers are busy performing a recording task and which are available to be assigned a recording task to perform. As each of the lower media recorder servers completes a recording task, the lower media recorder server may indicate to the higher media recorder server 1609 that the lower media recorder server is now available. Alternatively, each of the media recorder servers 1609 may maintain each of the other media recorder servers' 1609 respective state (e.g., busy, available, etc.) instead of the higher of the media recorder server 1609 maintaining the state of each of the lower media recorder servers 1609. The media recorder servers 1609 may individually report their status to one or more channel monitor servers 1608. A queue of available media recorder servers 1609 may be maintained, such as by the channel monitor servers 1608 or by another server. As one of the media recorder servers 1609, such as a third media recorder server 1609, becomes available, the media recorder server 1609 may insert itself into the queue. As the channel monitor server 1608 or guide scheduling server 1607 or other server has a task to be performed, these servers may query the queue for the next available media recorder server 1609 and assign the task to that media recorder server 1609.

The media recorder servers 1609 may access, such as from the linear storage 1604, a segment of content that has been requested to be recorded. Based on this single access of the segment, the channel monitor server 1608 may direct one of the available media recorder servers 1609 to write a copy of this segment to the recording storage 1611 for each request for the content item to be recorded. As an example, the third media recorder server 1609 may provide an instruction, such as via a network socket, to the recording storage 1611, wherein the instruction specifies the file of the segment and the number of times that the file is to be copied to the recording storage 1611. The instruction may comprise an HTTP command, such as PUT, POST, or PATCH. In this manner, the segment may be written multiple times to storage, but may be accessed only a single time. Thus, this may result in a performance increase of the media recorder server 1609 and the system as a whole because the read operation of the segment from the linear storage 1604 may occur a single time for all the segment copies instead of once for each segment copy. The third media recorder server 1609 may indicate to the channel monitor server 1608 that the third media recorder server 1609 has successfully written the copies of the segment and that the third media recorder server 1609 is available to perform another recording task. In the event that the third media recorder server 1609 is unsuccessful in its task (e.g., the recording storage 1611 indicates a disk error), the third media recorder server 1609 may indicate this status to the channel monitor server 1608 and the channel monitor server 1608 may direct the third media recorder server 1609 to attempt to repeat the recording task or assign the recording task to another of the media recorder servers 1609, such as second media recorder server 1609. This method may be repeated until all segments of the content item are copied to the recording storage 1611 and there is a complete copy of the content item in the recording storage 1611 for each user request to record the content item.

The channel monitor server 1608 may direct one of the media recorder servers 1609, such as the third media recorder server 1609, to write multiple copies of a segment to disk. Since the channel monitor server 1608 and the third media recorder server 1609 may know that the third media recorder server 1609 may write the same segment multiple times to the recording storage 1611, this fact may be leveraged to more efficiently perform the write operation. The channel monitor server 1608 may direct the third media recorder server 1609 to write the multiple copies of the segment in physical sequence on a hard disk of the recording storage 1611. By writing the multiple copies of the segment in sequence, a head of the hard disk may seek a write location on a hard disk platter only once. In contrast, a non-sequential write operation to a hard disk may involve multiple seek operations and, thus, may take longer to perform the write operation. In order to facilitate a sequential write operation of multiple copies of a segment, the channel monitor server 1608, the media recorder server 1609, and/or the recording storage 1611 may determine a total amount of storage required. This may comprise multiplying the quantity of copies of the segment that are to be written (e.g., the quantity of pending user requests to record the content item containing the segment) by the size of the segment. With the total amount of storage determined, the channel monitor server 1608, the media recorder server 1609, and/or the recording storage 1611 may access information on the status of the hard disks of the recording storage 1611, such as which hard disk blocks or partitions are available for writing. With this information and the total amount of storage required, a location on the disk may be determined to perform the sequential write of the multiple copies of the segment.

A batching strategy may be determined, such as by the media recorder server 1609, in which the multiple copies of a segment that are to be written to storage, such as the recording storage 1611, may be split into a plurality of sets or batches. The storage may be generally represented as media storage 1610 that may comprise recording storage 1611 and archive storage 1612. The splitting of the multiple copies of the segment into a plurality of batches may be based on a capacity or available capacity of a hard disk (or platter thereof) of the recording storage 1611 or a period of time in which the write operation must complete. If 100,000 copies of a 10 megabyte (MB) segment are to be written to the recording storage 1611 and each of the hard disks of the recording storage 1611 have a capacity of 800 gigabytes (GB), the 100,000 copies to be written may be split into ten batches of 10,000 copies each. Each of the ten batches may be executed, such as by the media recorder server 1609, to write the respective 10,000 copies of the segment to a separate respective hard disk in sequence. Each of the ten batches may be assigned by the channel monitor server 1608 to one of the media recorder servers 1609 to be executed.

An archive storage 1612 may be in communication with the media recorder server 1609 and/or the recording storage 1611, and may comprise one or more storage devices, such as a hard disk drive, a network-attached storage (NAS), and/or a storage area network (SAN). The archive storage 1612 may archive copies of content that have spent a certain amount of time in the recording storage 1611. That is, if a certain amount of time passes since content has been recorded and copies made in the recording storage 1611, the copies in the recording storage 1611 may be deleted and a single copy may be made in the archive storage 1612. If the archived content item is requested by a user to be delivered to the device 1606 of the user for playback, the media recorder server 1609 may access the copy of the content item in the archive storage 1612 and make a new copy of the content item in the recording storage 1611. The copy of the content item in the recording storage 1611 may be delivered to the device 1606 of the user, either directly or via the recording server 1609, which may be in communication with the recording storage 1611 directly or via the media recorder server 1609.

The segmented nature of the content item may be leveraged to begin delivering the content item from the recording storage 1611 to the device 1606 before the content item is completely copied from the archive storage 1612. Based on a user's request for delivery of content archived in the archive storage 1612, the media recorder server 1609 may begin by copying the first segment of the content item to the recording storage 1611. The recording server 1609 need not wait until all segments of the content item are copied to the recording storage 1611 before beginning to deliver the content item to the device 1606, but may instead begin delivering the segments of the content item based on one or more segments have been copied to the recording storage 1611. The media recorder server 1609 may continue copying subsequent segments (e.g., the second segment, the third segment, and so forth) of the content item to the recording storage 1611, which may be delivered to the device 1606. Preferably, the subsequent segments may be copied from the recording storage 1611 to the archive storage 1612 and delivered to the device 1606 at a rate sufficient for the playback of the segments on the device 1606 to be seamlessly maintained. If the playback on the device 1606 is stopped or paused and no additional segments of the content item are requested, a full duplicate copy may still be generated. The media recorder server 1609 may determine the segments of the content item that do not need to be delivered to the device 1606 (e.g., segments preceding a mid-content item playback start point, segments that are skipped during playback, such as those for a commercial, and segments subsequent to a playback stop point) and have not yet been copied to the recording storage 1611. Those segments may be copied from the archive storage 1612 to the recording storage 1611 to reconstitute the entire unique copy of the content item.

Capacity exchange server 1615 may gather current usage information from media storage 1610 (e.g., disk reads status, max disk reads capacity, disk writes status, and max disk writes capacity), current usage information from channel monitor servers 1608 and media recorder servers 1609 (e.g., compute network status and max compute network capacity), and media recorder servers 1609 (e.g., disk network status and max disk network capacity). This capacity information may be collected as described with respect to FIG. 5B and the capacity exchange server 1615 may exchange this capacity information with other network digital video recording systems.

Figure 17:
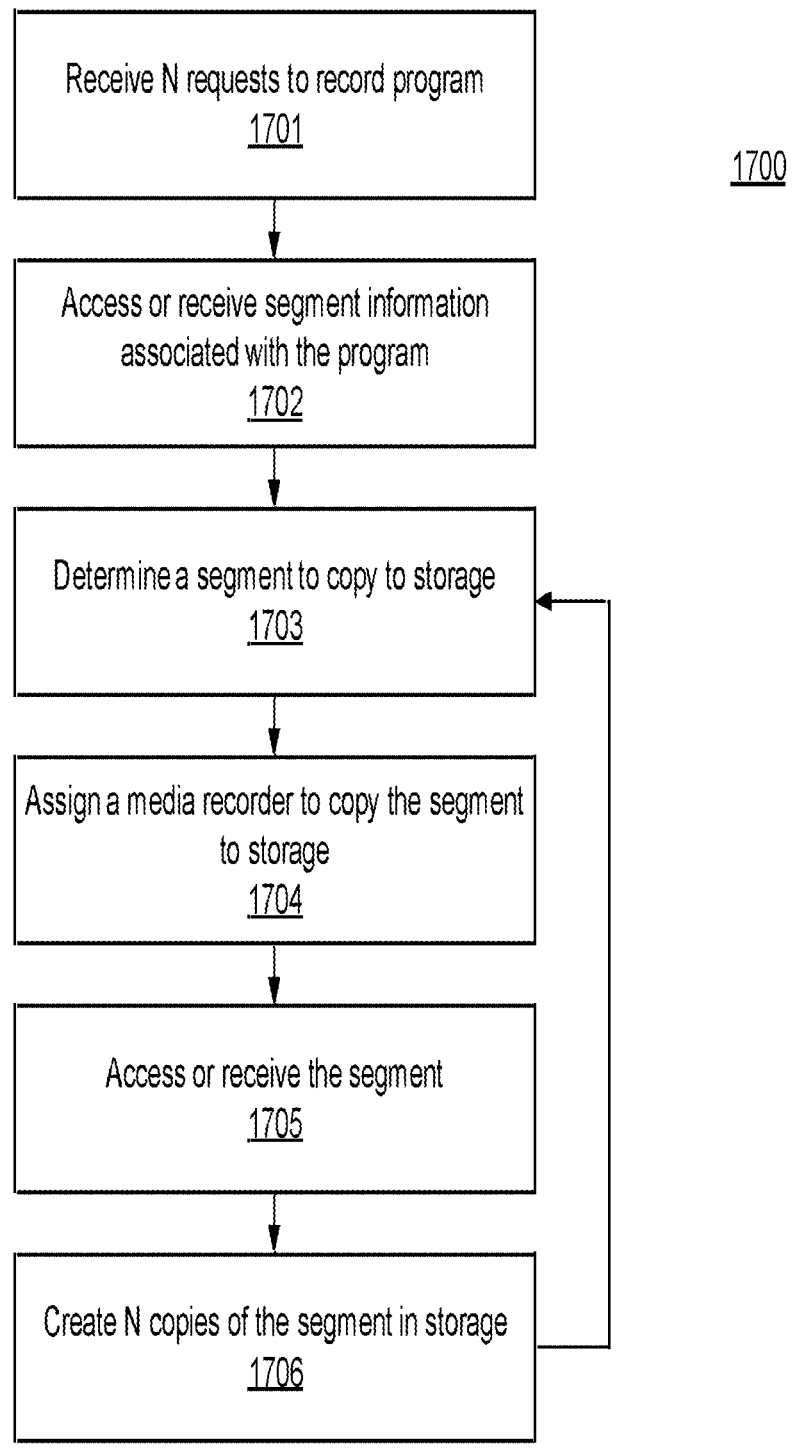
FIG. 17 is a flow chart showing an example method for recording segments.

FIG. 17 shows an example of a method 1700 for recording unique copies of segments based on user requests to record the content item. At step 1701, a number (N) of requests to record content may be received by the guide scheduling server 1607. The request may be provided by one or more devices 1606 associated with one or more users. A request to record the content item may be a real-time request, such as while a user is watching content and impulsively decides to record the content item. A request to record the content item may be a scheduled request. A scheduled request may be based on a user navigating a displayed television schedule and selecting a content item showing at a future time to be recorded. In the event that scheduled requests are managed by a scheduling module within the guide scheduling server 1607, the scheduling module may provide the request to record to the channel monitor server 1608 at the time that the content item is shown. The request to record content may comprise identifications of the user (e.g., an account identifier, a username, and/or a password), the device 1606, the content item, the station/channel, the linear stream (from the linear storage 1604 and/or from the linear server 1605), the start time of the content item, and/or the end time of the content item.

At step 1702, segment information associated with the content item may be accessed or received by the channel monitor server 1608. Concurrent to the requests for recording the content item being received, the content item may be received by the system from the content source 1601, wherein the content item is transcoded and segmented into segments. One or more manifest files may additionally be generated that describe the segmentation of the content item and a location of each segment making up the content item, such as a location in the linear storage 1604. Showing possible accessing or receiving segment information, the channel monitor server 1608 may access or receive, such as from the linear storage 1604, the manifest file associated with the content item.

At step 1703, based at least on the segment information, a segment of the content item may be determined, such as by the channel monitor server 1608, that will be copied to storage, such as the recording storage 1611. The channel monitor server 1608 may use the manifest file associated with the content item to extract the necessary segment information. The manifest file may indicate the total quantity of segments making up the content item or a portion of the content item, the length of the content item, the length of each segment, and an order or sequence of the segments. Based on the segment information and also, which, if any, segments of the content item have already been copied to storage, the channel monitor server 1608 may determine a segment of the content item to copy to storage. If the request to record content was for a complete content item (e.g., a scheduled request) and no segments of the content item had yet been determined and copied to storage, the channel monitor server 1608 may determine the first segment as the segment to copy to storage. Alternatively, if the first X segments of the content item had already been copied to storage, the channel monitor server 1608 may determine the next segment (e.g., the segment at the X+1 position in the sequence of segments) as the segment to copy to storage.

A reference to a copy, such as a copy of a segment, may refer to a second segment that comprises at least a portion of the original segment. A reference to a copy is not so limited as to require that a copy of a segment be identical in all regards to the original segment. Similarly, a reference to copying, such as copying an original segment, may refer to the act of generating a second segment that comprises at least a portion of the original segment. Moreover, a copy may be in reference to the content of content or segment without regard to form. A stored version of content in standard definition may be considered to be a copy of a stored version of the same content item in high definition. Two segments of the same content may be considered to be copies of each other although the first segment may be in one video format, such as H.264, and the second segment may be in another video format, such as H.262.

At step 1704, one of the media recorder servers 1609, such as the third media recorder server 1609, may be assigned by the channel monitor server 1608 to copy the determined segment of the content item to storage, such as the recording storage 1611, N times (e.g., one time for each user request to record the content item). The channel monitor server 1608 may maintain the status (e.g., busy, available, etc.) of each of the media recorder servers 1609. Based on the channel monitor server 1608 assigning one of the media recorder servers 1609, such as the third media recorder server 1609, to write a segment to storage or perform some other task, the channel monitor server 1608 may designate the third media recorder server 1609 as busy. After the third media recorder server 1609 completes the task, the third media recorder server 1609 may be designated as available. As the channel monitor servers 1608 (or other server) may track the status of each of the media recorder servers 1609, the channel monitor server 1608 may thus ascertain which of the media recorder servers 1609 is available.

The channel monitor server 1608 need not maintain the state of each of the media recorder servers 1609. Each of the media recorder servers 1609 may maintain each of the other media recorder servers' 1609 respective state. If one of the media recorder servers 1609, such as third media recorder server 1609, completes a task and transitions to an available state, the third media recorder server 1609 may insert itself into a queue of available media recorder servers at each channel monitor server 1608. If the channel monitor server 1608 has a task to be performed, such as writing copies of a segment to the recording storage 1611, the channel monitor server 1608 may query the queue of available media recorder servers and assign the task to the media recorder server at the top of the queue.

A separate queue in another server may maintain each media recorder servers' 1609 respective state. If one of the media recorder servers 1609, such as the third media recorder server 1609, is available based on completing a task, the third media recorder server 1609 may so indicate to the other server(s) and/or request an additional task from the other server(s). The other server(s) may maintain a pool of pending tasks and assign a task from the pool to the third media recorder server 1609 in response to a request from the third media recorder server 1609.

Based on a determination of an available media recorder server, which may be accomplished by a query of a queue of available media recorder servers, a request from an available media recorder server, or other method, the media recorder server 1609 may assign the determined media recorder server to copy the determined segment to the recording storage 1611 N times. As part of the assignment, the media recorder server 1609 may issue a command to the media recorder server to make N copies of the segment. The media recorder server 1609 may issue an HTTP POST command to the media recorder server that comprises a content identifier (e.g., a stream ID), a segment identifier (e.g., a start time, a stop time, and/or a duration of the segment), a segment file location (e.g., a URL or URI pointing to a file location on the linear storage 1604 or other storage), and a number of times to copy the segment to the recording storage 1611.

At step 1705, the assigned media recorder server, such as the third media recorder server 1609, may access or receive the segment from the linear storage 1604 a single time. The access or receipt may be based on information included in the command from the media recorder server 1609, such as the content item identifier, the segment identifier, and/or the segment file location (e.g., the segment URI).

At step 1706, the assigned media recorder server, such as the third media recorder server 1609, may generate N copies of the segment in storage, such as the recording storage 1611. This operation may be based off the single access or receipt of the segment from the linear storage 1604. The number of copies (e.g., N copies) may be specified in the command issued to the media recorder server from the media recorder server 1609. As part of generating N copies of the segment in the recording storage 1611, the third media recorder server 1609 may issue an HTTP PUT command to the recording storage 1611 that comprises a file location of the segment and the number of copies (e.g., N copies) of the segment to be made in the recording storage 1611. The N copies of the segment may be generated in the recording storage 1611 such that the N copies of the segment are written to a hard disk of the recording storage 1611 in physical sequence.

The assigned media recorder server, such as the third media recorder server 1609, may notify the channel monitor 1608 that the assigned media recorder server has successfully completed generating N copies of the segment in storage and that the assigned media recorder server is available. The channel monitor server 1609 may repeat step 1703 and determine another segment of either the same content item or another content item and repeat steps 1704 through 1706 for that segment. Multiple performances of steps 1703 through 1704 may occur simultaneously with different media recorder servers 1609 across the group of channel monitor servers 1608. The channel monitor servers 1608 for different channels may determine multiple different segments of content and assign each of the different segments to a different media recorder server (e.g., a first media recorder server 1609, a second media recorder server 1609, and the third media recorder server 1609) to be copied to storage. Each of the media recorder servers 1609 may simultaneously and/or independently access or receive their respective segment and generate N copies of the respective segment in storage. The method 1700 is not limited to performance in connection with a single content item and may be performed with respect to multiple content items simultaneously being requested to be recorded and copies of each being made in storage.

The following is a possible operation of the method 1700. A popular television show may be scheduled to be shown on an upcoming Sunday night. One hundred users of a system may log into the system and schedule for the television show to be recorded within the system on the Sunday night. On Sunday night, media recorder server 1609 may record a discrete copy of the content item for each of the one hundred requesting users. As the television show is received by a content source, the television show, or a portion thereof, may be broken into a number of segments, such as 30 2-second segments representing a 60-second rolling portion of the television show, and the segmentation may be documented in a separate file, such as a manifest file. Channel monitor server 1608 within the system may access the manifest file to determine a segment to copy to a recording storage, such as the recording storage 1611. If no segments have yet to be copied to the recording storage 1611, the channel monitor 1608 may select the first segment of the television show. In order to copy the first segment of the television show, the channel monitor server 1608 may perform a query of its media recorder servers to determine which media recorder servers are available and assign the copying task to an available media recorder server. The assigned media recorder server may generate one hundred copies of the first segment (once for each requesting user) in the recording storage 1611 by performing a single access of the first segment and commanding the recording storage 1611 to write the first segment, in sequence on the recording storage's 1611 hard disk, one hundred times. The assigned media recorder server may notify the channel monitor server 1608 that it is available after completion of the task. The channel monitor server 1608 may continue to assign available media recorder servers to generate one hundred copies of subsequent segments (e.g., the second segment, the third segment, etc.) in the recording storage 1611 for each of the 30 segments of the portion of the television show. The method may be repeated for subsequent 60-second portions of the television show until the complete television show is recorded. If one of the one hundred users wishes to view the user's stored version of the television show, the copy of the segments (associated with the user) of the television show may be delivered from the recording storage 1611 to the user's device, such as the device 1606, for playback.

Figure 18A:
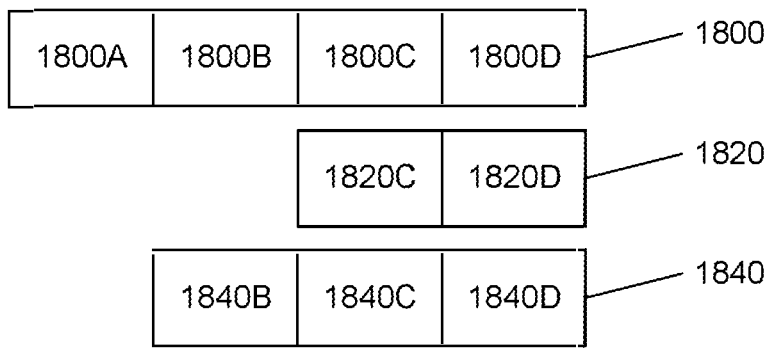
FIGS. 18A-18C show example representations of recordings of content items.

FIG. 18A is a possible representation of three recordings 1800, 1820, 1840 of content that are to be made based on three requests to record the content item received by the system. Each of the three recordings 1800, 1820, 1840 may comprise one or more sequential segments, designated as A, B, C, and/or D (e.g., 1800A, 1800B, and so forth). 1800B and 1840B may be identical segments, 1800C, 1820C, and 1840C may be identical segments, and so forth. The first recording 1800 may have been based on a scheduled request and may comprise all segments of the content item. The second recording 1820 and the third recording 1840 may each have been based on a real-time or impulse recording and each may lack one or more of the initial segments (e.g., the A segment).

Figure 18B:
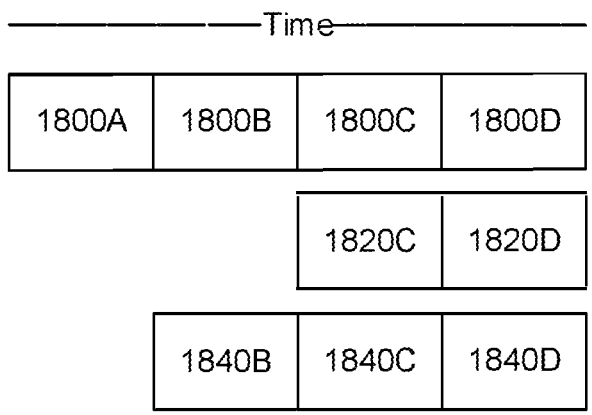

FIG. 18B shows a representation of the three recordings 1800, 1820, 1840 in storage. Each of the three recordings 1800, 1820, 1840 may have been retrieved from content that was received and stored in the linear storage 1604 and written to the recording storage 1611 independently. The B segment in the linear storage 1604 for segment 1800B may be accessed, the recording storage 1611 may seek an open location on one of its hard disks, and a copy may be written to the open location on the hard disk of the recording storage 1611. Independently, the B segment in the linear storage 1604 for segment 1840B may also be accessed, the recording storage 1611 may seek another location on one of its hard disks, and a copy may be also written to the location on the hard disk of the recording storage 1611. In this manner, the generation of segment 1800B and segment 1840B may require two accesses of linear storage, two hard disk seek operations, and two hard disk write operations. Extrapolating this method to the other segments of the three recordings 1800, 1820, 1840 may result in a total of nine accesses of linear storage 1604, nine hard disk seek operations, and nine hard disk write operations.

Figure 18C:
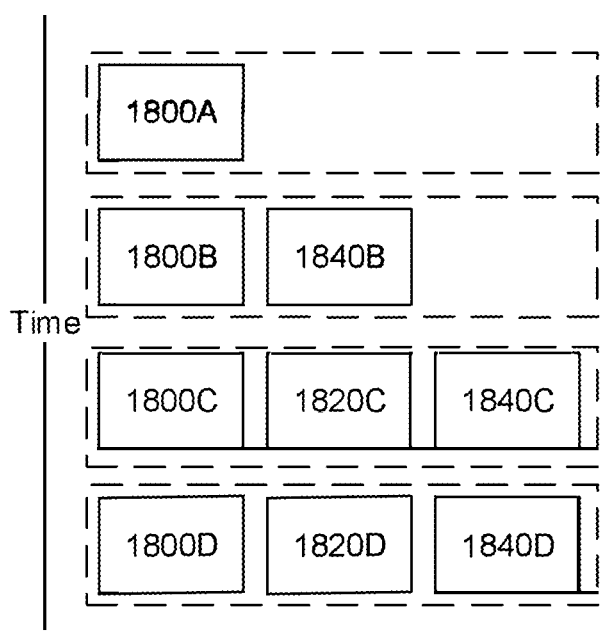

FIG. 18C shows another representation of the recordings 1800, 1820, 1840 in storage. In this representation, common segments (e.g., 1800B and 1840B or 1800C, 1820C, and 1840C, etc.) may be grouped together for accessing and writing to storage. The media recorder server 1609 may assign a media recorder server, such as first media recorder server 1609, to write segment 1800A to the recording storage 1611. The first media recorder server 1609 may access the A segment in the linear storage for segment 1800A and may direct the recording storage 1611 to generate one copy of the A segment. The recording storage 1611 may seek an open location on one of its hard disks for the one copy of the A segment, and a copy of the A segment may be written to the open location on the hard disk of the recording storage 1611. This operation may require one linear storage access, one hard disk seek operation, and one hard disk write operation. The media recorder server 1609 may assign a second media recorder server 1609, to write segments 1800B and 1840B to the recording storage 1611. The second media recorder server 1609 may access the B segment in the linear storage 1604 a single time and may direct the recording storage 1611 to generate two sequential copies of the B segment. The recording storage 1611 may seek an open location on one of its hard disks sufficient to accommodate the two copies of the B segment and may perform a single write operation comprising the two copies of the B segment (one each for segments 1800B and 1840B). Despite generating two copies of the B segment, this operation may be achieved with one linear storage 1604 access, one hard disk seek operation, and one hard disk write operation. The media recorder server 1609 may assign a third media recorder server, such as third media recorder server 1609, to write segments 1800C, 1820C, and 1840C to the recording storage 1611. The media recorder server 1609 may access the C segment in the linear storage 1604 a single time and may instruct the recording storage 1611 to generate three sequential copies of the C segment. The recording storage 1611 may seek an open location on one of its hard disks sufficient to fit the three copies of the C segment. The recording storage 1611 may perform a single write operation comprising the three copies of the C segment (one each for segments 1800C, 1820C, and 1840C). Despite generating three copies of the C segment, this operation may be achieved with one linear storage 1604 access, one hard disk seek operation, and one hard disk write operation. The method may be similarly performed for segments 1800D, 1820D, and 1840D. In total, generating the three recordings 1800, 1820, and 1840 may be achieved by four linear storage 1604 accesses, four hard disk seek operations, and four hard disk write operations.

The representation of FIG. 18C is in contrast to the representation of FIG. 18B. The method used to generate the arrangement of FIG. 18B and the method used to generate the arrangement of FIG. 10C may both result in the three recordings 1800, 1820, 1840 being generated in the recording storage 1611. The method used to generate the arrangement of FIG. 18B may perform the task with nine each of linear storage 1604 accesses, hard disk seek operations, and hard disk write operations; the method used to generate the arrangement of FIG. 18C may perform the task with four each of linear storage 1604 accesses, hard disk seek operations, and hard disk write operations. The method used to generate the arrangement of FIG. 18C, such as the method 1700 of FIG. 17, may result in a significant performance increase for a computer or series of computers on which the media recorder server 1609 operates and/or for the recording storage 1611.

Figure 19:
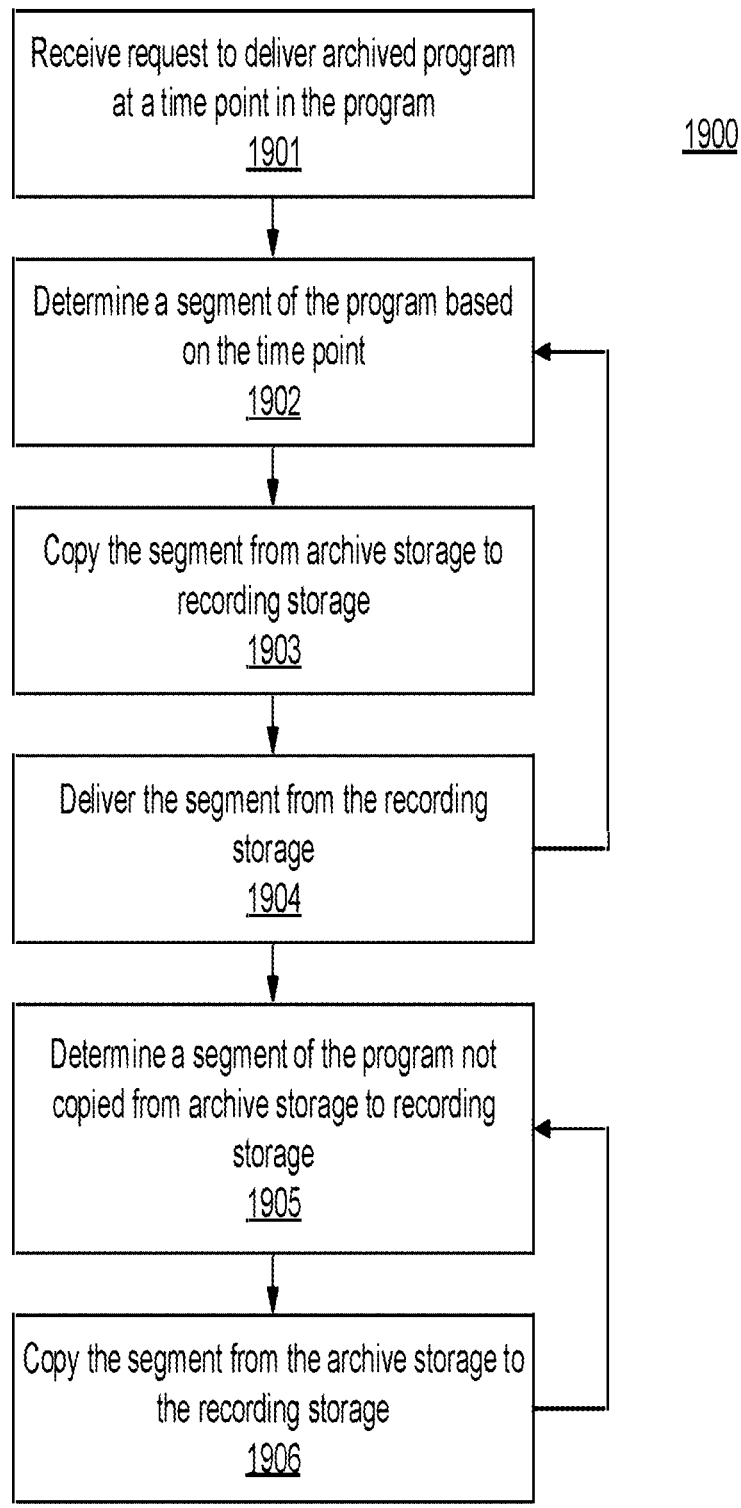
FIG. 19 is a flow chart showing an example method for delivering segments.

FIG. 19 shows an example of a method for delivering a content item, or portion thereof, to the device 1606 after a requesting user's unique copy is moved from a storage from which the content item may be delivered, such as the recording storage 1611, to an archive storage, such as the archive storage 1612. The copy of the content item in the archive storage 1612 may be a consolidated (i.e., not unique) copy of one or more unique recordings that were present in the recording storage 1611 but have since been removed after a certain period of time has passed since the recording(s) was made and/or last accessed in the recording storage 1611. If a user requests to playback the archived content item, a unique copy of the content item may be generated, such as in the recording storage 1611, for the requesting user. If the user does not playback the entire content item, such as if the user begins playback of the content item in the middle of the content item, and skips ahead in the content item (e.g., to skip a commercial), or the user ends the playback prematurely, the unique copy of the entirety of the content item may still be generated. In the method 1900, the segmented nature of content within the system may be leveraged to facilitate delivery and playback of the content item while the unique copy of the content item is generated.

At step 1901, a request to deliver an archived content item at a specified time point (e.g., a temporal location) in the content item may be received by the recording server 1609. The request may be made by a user and be received from the device 1606 of the user. The specified time point may indicate the start time of the content item or it may indicate a time point within the middle of the content item (e.g., the 10:30 mark in a 30:00 minute content item). The request to deliver an archived content item may reflect the user initiating the playback of the content item (whether from the beginning or the middle of the content item) or may reflect the user skipping ahead or backwards within the content item. The request may further comprise identifications of the user (e.g., an account identifier, a username, and/or a password), the device 1606, and/or the content item. Based on receiving the request, the recording server 1609 may communicate the request to the media recorder server 1609.

At step 1902 and based, at least, on the time point specified in the request, a segment of the content item may be determined by the media recorder server 1609. The determined segment may be intended to be associated with the requesting user. The association with the requesting user may be exclusive with respect to other users. To determine an appropriate segment, the media recorder server 1609 may reference a manifest file associated with the content item. For example, the specified time point may be cross-referenced with a listing in the manifest file of the segments of the content item and each of their associated time intervals to determine which of the segments corresponds to the specified time point. If one or more segments have already been determined, copied from the archive storage 1612, and delivered, the segment may be determined with consideration to those previous iterations. For example, if the initial segment corresponding to the specified time point and the subsequent two segments have already been copied from the archive storage 1612 and delivered, the third segment after the initial segment may be determined.

At step 1903, the determined segment may be copied from an archive storage, such as the archive storage 1612, to a storage appropriate for delivery of the segment and/or for maintaining the complete unique copy of the content item, such as the recording storage 1611. The copy of the segment in the recording storage 1611 may be associated with the requesting user. The association may be exclusive with respect to other users. The copying from the archive storage 1612 to the recording storage 1611 may be performed by or otherwise facilitated by the media recorder server 1609. The newly-copied segment may be combined or otherwise associated (such as a logical linking of linearly contiguous segments making up the content item or a portion thereof) with other segments of the content item in the recording storage 1611. For example, if prior segments of the content item have already been copied to the recording storage 1611, the newly-copied segment may be combined or otherwise associated with those prior segments.

At step 1904, the segment may be delivered from the recording storage 1611 to the device 1606 for playback. The delivery may be direct (e.g., the device 1606 downloads directly from the recording storage 1611) or indirect. As an example of an indirect delivery, the media recorder server 1609 may provide the segment to the recording server 1609, from which the segment may be delivered to the device 1606.

After the segment of the content item is delivered to the device 1606 from the recording storage 1611, steps 1902 through 1904 may be repeated for subsequent segments of the content item necessary to effectuate the requested playback of the content item. For example, if a user requested that content commence playback at the 10:00 (i.e., the ten minute, zero second) time point and the segments of the content item are two seconds each in length, the initial steps 1902 through 1904 may comprise determining a first segment for 10:00 to 10:02, copying the first segment from the archive storage 1612 to the recording storage 1611, and delivering the first segment to the device 1606. A second iteration of steps 1902 through 1904 may comprise determining a second segment for 10:02 to 10:04, copying the second segment from the archive storage 1612 to the recording storage 1611, and delivering the second segment to the device 1606. The iterative method may be repeated until the user stops playback of the content item or the final segment of the content item is delivered.

At step 1905, a segment may be determined, by the media recorder server 1609, that has not yet been copied from the archive storage, such as the archive storage 1612, to the storage that will maintain the unique copy of the content item for the requesting user, such as the recording storage 1611. The determined segment may be intended to be associated, exclusively with the requesting user. The determination may occur based on the completion of one or more iterations of steps 1902 through 1904. For example, if the user requested playback (and therefore delivery) of content at a mid-point of the content item, the segments from the mid-point of the content item to the end of the content item may have been copied from the archive storage 1612 to the recording storage 1611 in one or more iterations of steps 1902 through 1904. Therefore, the media recorder server 1609 may determine a segment from before the specified mid-point of the content item.

At step 1906, the determined segment of step 1905 may be copied from the archive storage 1612 to the recording storage 1611. The copy of the segment in the recording storage 1611 may be associated with the requesting user. The association may be exclusive with respect to other users of the system. The copying from the archive storage 1612 to the recording storage 1611 may be performed by or otherwise facilitated by the media recorder server 1609. The segment may be combined or otherwise associated (such as a logical linking of linearly contiguous segments making up the content item or a portion thereof) with other segments of the content item in the recording storage 1611. For example, the segment copied in step 1906 may be combined or otherwise associated with one or more segments copied in step 1903 or with one or more segments copied in prior iterations of step 1906.

Steps 1905 through 1906 may be repeated for other segments that had not yet been copied from the archive storage 1612 to the recording storage 1611, such as those copied in one or more iterations of steps 1902 through 1904 and/or prior iterations of steps 1905 through 1906. Continuing the example of the user requesting playback from the mid-point of the content item and the segments from the mid-point to the end of the content item already being copied to the recording storage 1611, steps 1905 through 1906 may be repeated multiple times until each of the segments prior to the mid-point are copied from the archive storage 1612 to the recording storage 1611. In this manner, all segments comprising the content item, and thus the entirety of the content item itself, may be copied to the recording storage 1611.

The following is a non-limiting example of the operation of the method 1900. A system user may have recorded a television show several months prior and may not have viewed it in the interim. The user's copy of the television show that was initially made in a recording storage, such as the recording storage 1611, may have been removed from the recording storage 1611 and there may exist only a copy in an archive storage, such as the archive storage 1612, that is not uniquely associated with the user. If the user requests playback of the television show, the entirety of the unique copy of the television show may be regenerated in the recording storage 1611, even if the user does not request the entirety of the television show for playback. The user may, for example, request that the system deliver the recorded television show for playback at a midway point in the show (the user may have watched the beginning of the television show when it was originally shown). A recording management system, such as the media recorder server 1609, of the system may determine the segment of the television show corresponding to the midway time point and copy that segment from the archive storage 1612 to the recording storage 1611. The copy of the segment in the recording storage 1611 may be delivered to the user's device, such as the device 1606, for playback. The media recorder server 1609 may determine, copy to the recording storage 1611, and deliver subsequent segments of the television show until the end of the television show is reached. Independent of the determining, copying, and delivery of the segments comprising the television show from the midway point and on, the segments of the television show prior to the midway point (which do not need to be delivered to the user's device) may also be copied to the recording storage 1611. The media recorder server 1609 may determine the first segment of the television show and generate a copy of that segment from the archive storage 1612 and send it to the recording storage 1611. The media recorder server 1609 may repeat this for subsequent segments until the midway point of the television show is reached. In this manner, the whole copy of the television show may be regenerated in the recording storage 1611, even though the user was able to begin playback of the television show at the midway point before the whole copy was made.

Figure 20:
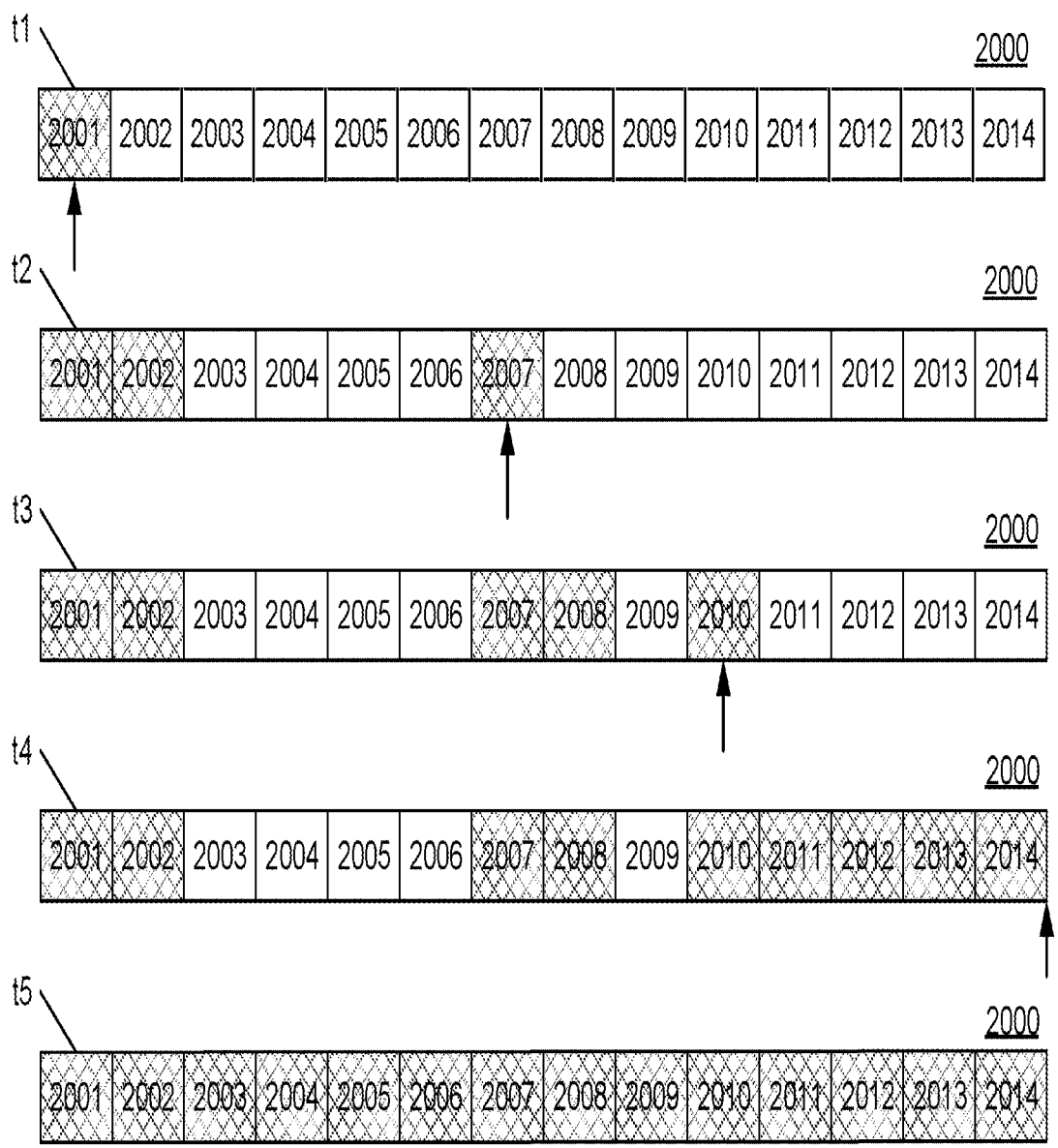
FIG. 20 shows example representations of recordings of content items.

FIG. 20 shows example representations of operations that may be performed in content recordings, such as described in FIG. 19, for fulfilling a request to deliver an archived content item starting at a specified time point and copying the content item from the archive storage 1612 to the recording storage 1611. Representations of content 2000 and its segments 2001-2014 are shown at succeeding times t1-t5. In FIG. 20, segments that are not yet copied from the archive storage 1612 to the recording storage 1611 are unshaded and segments that have been copied from the archive storage 1612 to the recording storage 1611 are patterned.

At time t1, a user may decide to begin playback of the archived content item 2000 from the beginning and, therefore, a request may be received to deliver the content item 2000 with a specified time point for the beginning of the content item 2000. Segment 2001 may be determined to correspond to the beginning of the content item 2000. Segment 2001 may be copied from the archive storage 1612 to the recording storage 1611 and segment 2001 may be delivered to the user's device 1606 for playback. The copying of segment 2001 to storage is representing by the patterned state of segment 2001.

At time t2, the user may have continued watching the content item 2000 and segment 2002 may have been delivered to the user's device 1606 and copied to the recording storage 1611, as reflected in the patterned state of segment 2002. After viewing segment 2002, the user may decide to skip ahead to a mid-point in the content item 2000 corresponding to segment 2007. Segment 2007 may be copied to the recording storage 1611, as reflected in the patterned state of segment 2007, and subsequently delivered to the user's device 1606 for playback.

At time t3, the user may have continued watching the content item 2000 from the mid-point of the content item 2000. Thus, segment 2008 may have been copied to the recording storage 1611, reflected in the patterned state of segment 2008, and delivered to the user's device 1606 for playback. After viewing segment 2008, the user may skip ahead, such as to skip a commercial, to a later point in time of the content item 2000 corresponding to segment 2010. Segment 2010 may be copied to the recording storage 1611, as reflected in the patterned state of segment 2010, and may be delivered to the user's device 1606 for playback.

At time t4, the user may have watched the content item until its conclusion and, thus, the remaining segments, segments 2011-2014 may have been copied to the recording storage 1611, reflected in the patterned state of segments 2011-2014, and delivered to the user's device 1606 for playback. At this time, the user's request to receive and playback the content item 2000 may have been fulfilled, but a complete unique copy of the content item 2000 may not yet be generated because segments 2003-2006 and 2009 may have not yet been copied to the recording storage 1611.

At time t5, segments 2003-2006 and 2009 may be determined as not having yet been copied to the recording storage 1611 and, therefore, may be copied from the archive storage 1612 to the recording storage 1611, as reflected in the patterned state of segments 2003-2006 and 2009. As can be seen at time t5, all segments may now have been copied to the recording storage 1611, thus forming a complete unique copy of the content item 2000.

The servers may comprise separate storage units and high capacity processing units or combined units or both. The storage units may comprise moving disks and/or solid state storage technologies. The processing units in the servers may implement the channel monitoring, media recording, metadata indexing, and capacity exchange functions. Ratios of the processing servers to the storage servers may be 1:10 for standard resolution recordings with the ratio changing to higher storage for higher resolution recordings including but not limited to 1:20, 1:30, and other ratios.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another possibility includes from the one particular value and/or to the other particular value. Similarly, when values are expressed as approximations, by use of the antecedent "about," it will be understood that the particular value forms another option. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that can be performed it is understood that each of these additional operations can be performed with any specific embodiment or combination of embodiments of the described methods.

As will be appreciated by one skilled in the art, the methods and systems may take the form hardware, of software, or a combination software and hardware. The methods and systems may take the form of a computer program product on a computer-readable storage medium having computer-readable program instructions (e.g., computer software) embodied in the storage medium. The methods and systems may take the form of web-implemented computer software. Any suitable computer-readable storage medium may be utilized including hard disks, CD-ROMs, optical storage devices, or magnetic storage devices.

Methods and systems are described with reference to block diagrams and flowcharts of methods, systems, apparatuses, and/or computer program products. It will be understood that each block of the block diagrams and flowcharts, and combinations of blocks in the block diagrams and flowcharts, respectively, can be implemented by computer program instructions. These computer program instructions may be loaded on a general-purpose computer, special-purpose computer, or other programmable data processing apparatus to produce a machine, such that the instructions that execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented method such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed. Systems and components described herein may be configured differently than described. For example, elements may be added to, removed from, or rearranged.

Various items may be described as being stored in memory or on storage while being used. These items or portions thereof may be transferred between memory and other storage devices for purposes of memory management and data integrity. Some or all software modules and/or systems may execute in memory on another device and communicate with the various computing systems via inter-computer communication. Some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all modules, systems, and data structures may also be stored (e.g., as software instructions or structured data) on a computer-readable medium, such as a hard disk, a memory, a network, or a portable media article to be read by an appropriate device or via an appropriate connection. Systems, modules, and data structures may be transmitted as generated data signals (e.g., as part of a carrier wave or other analog or digital propagated signal) on a variety of computer-readable transmission media, comprising wireless-based and wired/cable-based media, and may take a variety of forms (e.g., as part of a single or multiplexed analog signal, or as multiple discrete digital packets or frames). Computer program products may also take other forms.

Unless otherwise expressly stated, methods do not require operations to be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of alternatives or modifications described in the specification.

Implementations of the disclosure may be instantiated in a computer-usable data and/or computer-executable instructions, such as in one or more program modules, executed by one or more computers or other devices. Generally, program modules may comprise routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid-state memory, RAM, etc. The functionality of the program modules may be combined or distributed. In addition, the functionality may be embodied in whole or in part in firmware or hardware equivalents such as integrated circuits, field programmable gate arrays (FPGA), and the like. Particular data structures may be used to more effectively implement one or more concepts of the disclosure, and such data structures are contemplated within the scope of computer executable instructions and computer-usable data described herein.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a first network digital video recorder (nDVR) located in a first data center, a first utilization associated with the first nDVR;
   receiving, by the first nDVR, information indicating a second utilization associated with a second nDVR located in a second data center;
   storing, by the first nDVR and based on the first utilization and the second utilization, one or more content segments; and
   sending, by the first nDVR and to a computing device, the stored one or more content segments to cause output, by the computing device, of the stored one or more content segments.

2. The method of claim 1, further comprising:
   determining, by the first nDVR and based on the first utilization and the second utilization, that the second nDVR will not record the one or more content segments.

3. The method of claim 1, further comprising:
determining, by the first nDVR and based on the first utilization and the second utilization, that the second nDVR will record a second one or more content segments and that the first nDVR will not record the second one or more content segments.

4. The method of claim 1, further comprising:
storing the information in a first portion of a data structure; and
storing second information indicating the second utilization in a second portion of the data structure.

5. The method of claim 1, wherein the first utilization comprises one or more of: a current disk writing activity, a maximum disk writing activity capacity, a current disk reading activity, a maximum disk reading activity capacity, a current network activity, a maximum network activity capacity, a current computing activity, or a maximum computing activity capacity.

6. The method of claim 1, wherein the storing the one or more content segments is further based on one or more of:
a content channel associated with the first nDVR,
a content channel associated with the one or more content segments,
a geographic location of the first data center,
a geographic location of one or more users requesting the one or more content segments, or
the first nDVR already storing other content segments associated with the one or more content segments.

7. The method of claim 1, wherein the one or more content segments are associated with one or more of:
a content item selected by a user for recording,
previously stored content that is to be archived, or
previously stored content that is to be moved to a media storage from which the content is available for playback.

8. The method of claim 1, wherein the storing the one or more content segments is further based on one or more issues associated with the second nDVR, wherein the one or more issues comprise one or more of:
a loss of communication between the first nDVR and the second nDVR,
an inability to satisfy one or more user recording requests,
a current disk writing activity exceeding a disk writing activity threshold value,
a current disk reading activity exceeding a disk reading activity threshold value,
a current network activity exceeding a network activity threshold value,
a current computing activity exceeding a computing activity threshold value,
a component failure,
a network failure,
an incapacity of the second nDVR,
a failure to receive a heartbeat message from the second nDVR, or
a failure to receive second information indicating a third utilization expected from the second nDVR.

9. The method of claim 1, wherein, one or more of:
the first nDVR is associated with a first group of users and the second nDVR is associated with a second group of users, or
the first data center is at a first location and the second data center is at a second location.

10. The method of claim 1, wherein the one or more content segments are associated with one or more of: video content, audio content, media content, stored content, recorded content, an audio program, a video program, an audio/video program, a content item, or a television show.

11. The method of claim 1, wherein the causing output of the stored one or more content segments comprises:
causing output, to one or more user devices, of the stored one or more content segments.

12. The method of claim 1, wherein the first nDVR comprises one or more servers located in the first data center, and wherein the second nDVR comprises one or more servers located in the second data center.

13. The method of claim 1, wherein the first data center and the second data center are associated with a same service provider.

14. An apparatus comprising:
one or more processors; and
memory storing instructions that, when executed by the one or more processors, cause the apparatus to:
determine a first utilization associated with the apparatus, wherein the apparatus is located in a first data center;
receive information indicating a second utilization associated with a network digital video recorder (nDVR) located in a second data center;
store, based on the first utilization and the second utilization, one or more content segments; and
send, to a computing device, the stored one or more content segments to cause output, by the computing device, of the stored one or more content segments.

15. The apparatus of claim 14, wherein the instructions, when executed by the one or more processors, further cause the apparatus to:
determine, based on the first utilization and the second utilization, that the nDVR will not record the one or more content segments.

16. The apparatus of claim 14, wherein the instructions, when executed by the one or more processors, further cause the apparatus to:
determine, based on the first utilization and the second utilization, that the nDVR will record a second one or more content segments and that the apparatus will not record the second one or more content segments.

17. The apparatus of claim 14, wherein the instructions, when executed by the one or more processors, further cause the apparatus to:
store the information in a first portion of a data structure; and
store second information indicating the second utilization in a second portion of the data structure.

18. The apparatus of claim 14, wherein the first utilization comprises one or more of: a current disk writing activity, a maximum disk writing activity capacity, a current disk reading activity, a maximum disk reading activity capacity, a current network activity, a maximum network activity capacity, a current computing activity, or a maximum computing activity capacity.

19. The apparatus of claim 14, wherein the storing the one or more content segments is further based on one or more of:
a content channel associated with the apparatus,
a content channel associated with the one or more content segments,
a geographic location of the first data center,
a geographic location of one or more users requesting the one or more content segments, or
the apparatus already storing other content segments associated with the one or more content segments.

20. The apparatus of claim 14, wherein the one or more content segments are associated with one or more of:
- a content item selected by a user for recording,
- previously stored content that is to be archived, or
- previously stored content that is to be moved to a media storage from which the content is available for playback.

21. The apparatus of claim 14, wherein the storing the one or more content segments is further based on one or more issues associated with the nDVR, wherein the one or more issues comprise one or more of:
- a loss of communication between the apparatus and the nDVR,
- an inability to satisfy one or more user recording requests,
- a current disk writing activity exceeding a disk writing activity threshold value,
- a current disk reading activity exceeding a disk reading activity threshold value,
- a current network activity exceeding a network activity threshold value,
- a current computing activity exceeding a computing activity threshold value,
- a component failure,
- a network failure,
- an incapacity of the nDVR,
- a failure to receive a heartbeat message from the nDVR, or
- a failure to receive second information indicating a third utilization expected from the nDVR.

22. The apparatus of claim 14, wherein, one or more of:
- the apparatus is associated with a first group of users and the nDVR is associated with a second group of users, or
- the first data center is at a first location and the second data center is at a second location.

23. The apparatus of claim 14, wherein the one or more content segments are associated with one or more of: video content, audio content, media content, stored content, recorded content, an audio program, a video program, an audio/video program, a content item, or a television show.

24. The apparatus of claim 14, wherein the causing output of the stored one or more content segments comprises:
- causing output, to one or more user devices, of the stored one or more content segments.

25. The apparatus of claim 14, wherein the first data center and the second data center are associated with a same service provider.

26. A method comprising:
- receiving, by a first network digital video recorder (nDVR) located in a first data center, data indicating one or more content segments;
- determining, by the first nDVR, a first utilization associated with the first nDVR;
- receiving, by the first nDVR, information indicating a second utilization associated with a second nDVR located in a second data center; and
- determining, by the first nDVR and based on the first utilization and the second utilization, that the second nDVR will store the one or more content segments, wherein the stored one or more content segments are selectable by the second nDVR for output by a computing device.

27. The method of claim 26, further comprising:
- determining, by the first nDVR and based on the first utilization and the second utilization, that the first nDVR will not store the one or more content segments.

28. The method of claim 26, further comprising:
- storing, by the second nDVR, the one or more content segments.

29. The method of claim 26, further comprising:
- causing output, by the second nDVR and to one or more user devices, of the one or more content segments.

30. The method of claim 26, further comprising:
- determining, by the first nDVR, that a second one or more content segments are stored by the second nDVR, wherein the one or more content segments and the second one or more content segments are associated with a common content item, and
- wherein the determining that the second nDVR will store the one or more content segments is further based on the determining that the second one or more content segments are stored by the second nDVR.

31. The method of claim 26, further comprising:
- storing, by the first nDVR and based on the first utilization and the second utilization, a second one or more content segments associated with the one or more content segments,
- wherein the one or more content segments and the second one or more content segments comprise common video content at different video resolutions.

32. The method of claim 26, further comprising:
- storing, by the first nDVR and based on the first utilization, the second utilization, and one or more issues associated with the second nDVR, second one or more content segments, wherein the one or more issues comprise one or more of:
- a loss of communication between the first nDVR and the second nDVR,
- an inability to satisfy one or more user recording requests,
- a current disk writing activity exceeding a disk writing activity threshold value,
- a current disk reading activity exceeding a disk reading activity threshold value,
- a current network activity exceeding a network activity threshold value,
- a current computing activity exceeding a computing activity threshold value,
- a component failure,
- a network failure,
- an incapacity of the second nDVR,
- a failure to receive a heartbeat message from the second nDVR,
- or a failure to receive second information indicating a third utilization expected from the second nDVR.

33. The method of claim 26, wherein the first nDVR comprises one or more servers located in the first data center, and wherein the second nDVR comprises one or more servers located in the second data center.

34. The method of claim 26, wherein the first data center and the second data center are associated with a same service provider.

35. An apparatus comprising:
- one or more processors; and
- memory storing instructions that, when executed by the one or more processors, cause the apparatus to:
  - receive data indicating one or more content segments;
  - determine a first utilization associated with the apparatus, wherein the apparatus is located in a first data center;
  - receive information indicating a second utilization associated with a network digital video recorder (nDVR) located in a second data center; and
  - determine, based on the first utilization and the second utilization, that the nDVR will store the one or more content segments, wherein the stored one or more content segments are selectable by the nDVR for output by a computing device.

36. The apparatus of claim 35, wherein the instructions, when executed by the one or more processors, further cause the apparatus to:
    determine, based on the first utilization and the second utilization, that the apparatus will not store the one or more content segments.

37. The apparatus of claim 35, wherein the instructions, when executed by the one or more processors, further cause the apparatus to:
    determine, that a second one or more content segments are stored by the nDVR, wherein the one or more content segments and the second one or more content segments are associated with a common content item, and
    wherein the determining that the nDVR will store the one or more content segments is further based on the determining that the second one or more content segments are stored by the nDVR.

38. The apparatus of claim 35, wherein the instructions, when executed by the one or more processors, further cause the apparatus to:
    store, based on the first utilization and the second utilization, a second one or more content segments associated with the one or more content segments,
    wherein the one or more content segments and the second one or more content segments comprise common video content at different video resolutions.

39. The apparatus of claim 35, wherein the instructions, when executed by the one or more processors, further cause the apparatus to:
    store, based on the first utilization, the second utilization, and one or more issues associated with the nDVR, second one or more content segments, wherein the one or more issues comprise one or more of:
    a loss of communication between the apparatus and the nDVR,
    an inability to satisfy one or more user recording requests,
    a current disk writing activity exceeding a disk writing activity threshold value,
    a current disk reading activity exceeding a disk reading activity threshold value,
    a current network activity exceeding a network activity threshold value,
    a current computing activity exceeding a computing activity threshold value,
    a component failure,
    a network failure,
    an incapacity of the nDVR,
    a failure to receive a heartbeat message from the nDVR, or
    a failure to receive second information indicating a third utilization expected from the nDVR.

40. The apparatus of claim 35, wherein the first data center and the second data center are associated with a same service provider.

* * * * *